United States Patent
Shveidel et al.

(10) Patent No.: US 12,287,740 B2
(45) Date of Patent: Apr. 29, 2025

(54) DATA CACHING STRATEGIES FOR STORAGE WITH OWNERSHIP OF LOGICAL ADDRESS SLICES

(71) Applicant: Dell Products L.P., Hopkinton, MA (US)

(72) Inventors: Vladimir Shveidel, Pardes-Hana (IL); Uri Shabi, Tel Mond (IL); Vamsi K. Vankamamidi, Hopkinton, MA (US); Samuel L. Mullis, II, Raleigh, NC (US)

(73) Assignee: Dell Products L.P, Hopkinton, MA (US)

( * ) Notice: Subject to any disclaimer, the term of this patent is extended or adjusted under 35 U.S.C. 154(b) by 0 days.

(21) Appl. No.: 18/206,809

(22) Filed: Jun. 7, 2023

(65) Prior Publication Data

US 2024/0411702 A1 Dec. 12, 2024

(51) Int. Cl.
G06F 12/1045 (2016.01)
G06F 3/06 (2006.01)

(52) U.S. Cl.
CPC ........ G06F 12/1045 (2013.01); G06F 3/0611 (2013.01); G06F 3/0638 (2013.01); G06F 3/0673 (2013.01); G06F 2212/604 (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16;
(Continued)

(56) References Cited

U.S. PATENT DOCUMENTS 5,247,642 A * 9/1993 Kadlec .................... G06F 13/14
711/3
5,455,957 A * 10/1995 Pawlowski ......... G06F 12/0684
711/E12.089
(Continued)

OTHER PUBLICATIONS

Distributed Caching—The Only Guide You'll Ever Need; Sudheer Sandu; Jul. 8, 2022; retrieved from https://medium.com/@sudheer.sandu/distributed-caching-the-only-guide-youll-ever-need-fe152357f912 on Jul. 12, 2024 (Year: 2022).*
(Continued)

Primary Examiner — Daniel C. Chappell
(74) Attorney, Agent, or Firm — Muirhead and Saturnelli, LLC

(57) ABSTRACT

In at least one embodiment, processing can include receiving, at a first node, a read request directed to a logical address LA owned by a second node. The first node can locally cache content and an address hint corresponding to LA. The first node can issue a request to the second node. The request can include a flag to suppress the second node from returning content stored at the target logical address. The first node can receive a response including an address used to read current content of LA1 from back-end non-volatile storage. The first node can determine whether the address matches the address hint cached on the first node. If the first node determines the address and address hint match, the cached content of LA stored on the first node is valid and can be returned in response to the read as current content stored at LA.

20 Claims, 17 Drawing Sheets

(58) Field of Classification Search
CPC ... G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 5,530,933 | A * | 6/1996 | Frink | G06F 12/0831 |
| | | | | 711/119 |
| 5,613,153 | A * | 3/1997 | Arimilli | G06F 12/0835 |
| | | | | 711/146 |
| 5,666,514 | A * | 9/1997 | Cheriton | G06F 11/1407 |
| | | | | 714/E11.115 |
| 5,751,996 | A * | 5/1998 | Glew | G06F 12/0888 |
| | | | | 712/E9.046 |
| 5,829,010 | A * | 10/1998 | Cherabuddi | G06F 12/0884 |
| | | | | 711/131 |
| 6,298,411 | B1 * | 10/2001 | Giacalone | G06F 12/1063 |
| | | | | 711/3 |
| 6,496,917 | B1 * | 12/2002 | Cherabuddi | G06F 12/0831 |
| | | | | 711/204 |
| 6,601,144 | B1 * | 7/2003 | Arimilli | G06F 12/0831 |
| | | | | 711/146 |
| 6,629,210 | B1 * | 9/2003 | Arimilli | G06F 12/121 |
| | | | | 711/E12.07 |
| 7,882,307 | B1 * | 2/2011 | Wentzlaff | G06F 13/16 |
| | | | | 711/119 |
| 8,594,664 | B1 * | 11/2013 | Worrall | H04W 8/02 |
| | | | | 455/433 |
| 9,311,249 | B2 * | 4/2016 | Bybell | G06F 12/1027 |
| 9,436,619 | B2 * | 9/2016 | Woolley | G06F 9/547 |
| 9,606,870 | B1 * | 3/2017 | Meiri | G06F 11/2069 |
| 9,696,919 | B1 * | 7/2017 | Vankamamidi | G06F 3/0619 |
| 9,823,854 | B2 * | 11/2017 | Valenzuela | G06F 12/0897 |
| 9,916,095 | B2 * | 3/2018 | Stabrawa | G06F 3/0667 |
| 10,120,802 | B2 * | 11/2018 | Busaba | G06F 12/084 |
| 10,261,693 | B1 * | 4/2019 | Schneider | G06F 3/067 |
| 10,331,498 | B1 * | 6/2019 | Shveidel | G06F 9/524 |
| 10,599,566 | B2 * | 3/2020 | Adaikkalavan | G06F 12/0808 |
| 10,606,755 | B2 * | 3/2020 | Vasudevan | G06F 3/068 |
| 10,664,400 | B2 * | 5/2020 | Swaine | G06F 12/0808 |
| 10,691,616 | B1 * | 6/2020 | Shveidel | G06F 9/544 |
| 10,901,639 | B2 * | 1/2021 | Booss | G06F 3/0673 |
| 10,996,853 | B2 * | 5/2021 | Kucherov | G06F 3/0607 |
| 11,899,607 | B2 * | 2/2024 | Hayes | G06F 12/0831 |
| 11,921,635 | B2 * | 3/2024 | Koker | G06F 12/0811 |
| 2003/0009623 | A1 * | 1/2003 | Arimilli | G06F 12/0813 |
| | | | | 711/119 |
| 2005/0160132 | A1 * | 7/2005 | Van Doren | G06F 12/0828 |
| | | | | 709/200 |
| 2007/0143549 | A1 * | 6/2007 | Saha | G06F 12/0822 |
| | | | | 711/E12.028 |
| 2010/0034143 | A1 * | 2/2010 | Cordeiro | H04W 48/08 |
| | | | | 370/328 |
| 2011/0078492 | A1 * | 3/2011 | Kumar | G06F 12/0817 |
| | | | | 711/146 |
| 2013/0111150 | A1 * | 5/2013 | Zhao | G06F 12/0833 |
| | | | | 711/144 |
| 2014/0204884 | A1 * | 7/2014 | Bucknell | H04L 47/10 |
| | | | | 370/329 |
| 2019/0095336 | A1 * | 3/2019 | Barczak | G06F 9/45558 |
| 2020/0034212 | A1 * | 1/2020 | Shveidel | G06F 9/52 |
| 2020/0042445 | A1 * | 2/2020 | Shveidel | G06F 12/0891 |
| 2020/0125265 | A1 * | 4/2020 | Schneider | G06F 3/061 |
| 2020/0249858 | A1 * | 8/2020 | Vankamamidi | G06F 3/0673 |
| 2021/0124689 | A1 * | 4/2021 | Kucherov | G06F 12/0893 |
| 2022/0019350 | A1 * | 1/2022 | Karr | G06F 3/0604 |
| 2022/0066944 | A1 * | 3/2022 | Hayes | H04L 41/02 |
| 2022/0245150 | A1 * | 8/2022 | Delbru | G06F 16/24544 |
| 2023/0132931 | A1 * | 5/2023 | Greathouse | G06F 3/061 |
| | | | | 711/154 |

OTHER PUBLICATIONS

ACME: Adaptive Caching Using Multiple Experts; Ari et al.; Proceedings inf Informatics, vol. 14; 2002; retrieved from https://bobby.gramacy.com/prepo/gra2003-03.pdf on Jul. 12, 2024 (Year: 2002).*

A. Ros and A. Jimborean, "A Dual-Consistency Cache Coherence Protocol," 2015 IEEE International Parallel and Distributed Processing Symposium, Hyderabad, India, 2015, pp. 1119-1128, doi: 10.1109/IPDPS.2015.43. (Year: 2015).*

O. Khan, M. Lis, Y. Sinangil and S. Devadas, "DCC: A Dependable Cache Coherence Multicore Architecture," in IEEE Computer Architecture Letters, vol. 10, No. 1, pp. 12-15, Jan.-Jun. 2011, doi: 10.1109/L-CA.2011.3. (Year: 2011).*

G. Li, O. Temam, Z. Liu, D. Wang, S. Guo and C. Li, "Cluster Cache Monitor," 2013 25th International Symposium on Computer Architecture and High Performance Computing, Porto de Galinhas, Brazil, 2013, pp. 1-8, doi: 10.1109/SBAC-PAD.2013.5. (Year: 2013).*

M. Pengyong and C. Shuming, "MID: a Novel Coherency Protocol in Chip Multiprocessor," The Sixth IEEE International Conference on Computer and Information Technology (CIT'06), Seoul, Korea (South), 2006, pp. 50-50, doi: 10.1109/CIT.2006.119. (Year: 2006).*

P. Ma and S. Chen, "M^{2}SI: An Improved Coherency Protocol in CMP," 2007 International Conference on Networking, Architecture, and Storage (NAS 2007), Guilin, China, 2007, pp. 243-244, doi: 10.1109/NAS.2007.34. (Year: 2007).*

U.S. Appl. No. 18/160,404, filed Jan. 27, 2023, entitled System and Method for Managing Data Portion Ownership in a Storage Cluster, to Vladimir Shveidel, et al.

U.S. Appl. No. 18/159,723, filed Jan. 26, 2023, entitled Adaptive Cache Management System and Method, to Vladimir Shveidel, et al.

* cited by examiner

DATA CACHING STRATEGIES FOR STORAGE WITH OWNERSHIP OF LOGICAL ADDRESS SLICES

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving, from a host at a first of a plurality of nodes, a read I/O operation that requests to read current content stored at a target logical address, wherein the first node does not own the target logical address and wherein a second of the plurality of nodes owns the target logical address, wherein a first cache of the first node includes first information corresponding to the target logical address, wherein the first information of the first cache includes first content and a first address hint corresponding to the target logical address; the first node issuing a first request to the second node to perform first address resolution processing with respect to the target logical address owned by the second node, wherein the first request includes a first flag requesting that the second node, in response to the first request, suppress returning content stored at the target logical address; receiving, by the first node from the second node, a first response to the first request, wherein the first response includes a first address used to read current content stored at the target logical address from back-end non-volatile storage; and responsive to receiving the first response, the first node performing first processing including: determining whether the first address of the first response matches the first address hint stored in the first cache of the first node; and responsive to determining that the first address of the first response and the first address hint of the first cache match, performing second processing including: determining that the first content cached in the first cache of the first node is valid and corresponds to current content stored at the target logical address; and returning, in response to the read I/O operation, the first content cached in the first cache of the first node.

In at least one embodiment, the first processing can include: responsive to determining the first address of the first response and the first address hint of the first cache do not match, performing third processing including: determining that the first content cached in the first cache of the first node is invalid and does not correspond to current content stored at the target logical address; using the first address returned in the first response to read second content stored at the target logical address from back-end non-volatile storage; and returning the second content in response to the read I/O operation. The third processing can include updating the first information of the first cache of the first node, wherein said updating includes storing the second content and the first address included in the first response from the second node in the first cache of the first node, wherein the second content and the first address are included in the first information corresponding to the target logical address. Updating the first information of the first cache of the first node can include removing the first content and the first address hint from the first cache of the first node.

In at least one embodiment, the first address resolution processing performed by the second node in response to receiving the first request can include using first mapping information including a plurality of metadata (MD) pages to map the target logical address to the first address included in the first response. The first address can be a first indirect pointer (IDP) to a physical storage location on back-end non-volatile storage including current content stored at the target logical address. The first address can be an address of, or pointer to, a physical storage location on back-end non-volatile storage including current content stored at the target logical address.

In at least one embodiment, processing can include: receiving, from the host at the first node, a second read I/O operation that requests to read current content stored at a second target logical address, wherein the first node does not own the second target logical address and wherein the second node owns the target logical address, wherein the first cache of the first node does not include cached content corresponding to the target logical address; the first node issuing a second request to the second node to perform second address resolution processing with respect to the second target logical address owned by the second node; responsive to receiving the second request, the second node performing third processing including: determining that a second cache of the second node includes second content corresponding to current content stored at the second target logical address; and sending, by the second node to the first node, a second response to the second request, wherein the second response includes the second content of the second cache that corresponds to current content stored at the second target logical address and wherein the second response includes a second address used to read current content stored at the second target logical address from back-end non-volatile storage.

In at least one embodiment, processing can include: receiving, by the first node from the second node, the second response to the second request, wherein the second response includes the second address used to read the first content stored at the target logical address from back-end non-volatile storage and wherein the second response includes the second content of the second cache that corresponds to current content stored at the second target logical address; responsive to receiving the second response, the first node performing fourth processing including: determining that the first cache of the first node does not include content stored at the second target logical address; and responsive to determining that the first cache of the first node does not include content stored at the second target logical address, storing second information in the first cache of the first node, wherein the second information corresponds to the second target logical address and wherein the second information includes the second address of the second response and includes the second content of the second response, wherein the second address denotes a second address hint used in connection with validating that the second content of the first cache denotes current content stored at the second target logical address. Fourth processing can include the first node returning the second content in response to the second read I/O operation.

In at least one embodiment, processing can include: partitioning a logical address space into a plurality of slices where each of the plurality of slices corresponds to one of a first plurality of logical address subranges of the logical address space; forming a plurality of sets, wherein each of the plurality of sets includes a portion of the plurality of slices; and assigning the plurality of sets to the plurality of nodes of a storage system, where each of the plurality of nodes is assigned a single one of the plurality of sets, wherein said each node owns slices of said single set assigned to said each node, and wherein said each node owns logical addresses of slices included in said single set assigned to said each node.

In at least one embodiment, the plurality of nodes can be two nodes, the first node and the second node. Processing can include: assigning a slice identifier (ID) to each of the plurality of slices, said slice ID uniquely identifying said each slice with respect to other of the plurality of slices, where each slice ID assigned to a corresponding one of the plurality of slices is an integer included in a sequence of consecutive increasing integers; forming a first slice set including only first slices, where the first slices only include ones of the plurality of slices having an odd slice ID; and forming a second slice set including only second slices, where the second slices only include ones of the plurality of slices having an even slice ID, wherein the first slice set denotes slices owned by one of the first node and the second node, and wherein the second slice set denotes slices owned by an other of the first node and the second node. Slices of the first slice set can be interleaved with slices of the second slice set in the logical address space, wherein the first plurality of logical address subranges of the logical address space can ne consecutive contiguous subranges of logical addresses, and wherein the slice IDs assigned to the plurality of slices can denote a relative position of the plurality of slices in the logical address space.

Various embodiments of the techniques herein can include a computer-implemented second method, a system and a non-transitory computer readable medium. The system can include one or more processors, and a memory comprising code that, when executed, performs the second method. The non-transitory computer readable medium can include code stored thereon that, when executed, performs the second method. The second method can comprise: partitioning a logical address space into a plurality of slices where each of the plurality of slices corresponds to one of a first plurality of logical address subranges of the logical address space; forming a plurality of sets, wherein each of the plurality of sets includes a portion of the plurality of slices; assigning the plurality of sets to a plurality of nodes of a storage system, where each of the plurality of nodes is assigned a single one of the plurality of sets, wherein said each node owns slices of said single set assigned to said each node, and wherein said each node owns logical addresses of slices included in said single set assigned to said each node; selecting, in accordance with one or more criteria, one of a plurality of caching techniques to apply in the storage system, wherein the plurality of caching techniques includes a first technique and a second technique, wherein the first technique allows each node to cache content of logical addresses owned by said each node and does not allow said each node to cache content of logical addresses that are not owned by said each node, wherein the second technique allows each node to cache content of logical addresses that are owned by said each node and allows said each node to cache content of logical addresses that are not owned by said each node; and applying the selected one technique in the storage system in connection with caching content of logical addresses.

In at least one embodiment, the plurality of caching techniques can include a third technique that allows each node to cache content of logical addresses owned by said each node and does not allow said each node to cache content of logical addresses that are not owned by said each node. Processing can include selecting the third technique as the selected one technique and wherein said applying the selected one technique can include applying the third technique on the storage system. Applying the third technique in connection with servicing a read I/O operation can include: a non-owner node of a first logical address LA1 receiving the read I/O operation directed to LA1; the non-owner node issuing a request to an owner node of LA1 to perform address resolution processing for LA1; responsive to receiving the request, the owner node performing address resolution processing of LA1 using first mapping information and determining a first address used to read first content stored at LA1 from back-end non-volatile storage; the owner node returning, to the non-owner node, a response to the request, wherein the response includes the first address; the owner node using the first address to perform a speculative or opportunistic read of the first content stored at LA1 from back-end non-volatile storage; the owner node caching the first content, as read from back-end non-volatile storage, in a first cache of the first node, wherein the first content cached on the first cache of the first node is associated with LA1. Responsive to the non-owner node receiving the response, the non-owner node can perform first processing including: using the first address of the response to read the first content stored at LA1 from back-end non-volatile storage; and returning the first content in response to the read I/O operation without caching the first content in a local cache of the non-owner node.

In at least one embodiment, processing can include selecting the second technique as the selected one technique. Applying the selected one technique can include applying the second technique on the storage system. Applying the second technique in connection with servicing a read I/O operation can include: a non-owner node of a first logical address LA1 receiving the read I/O operation directed to LA1; the non-owner node issuing a request to an owner node of LA1 to perform address resolution processing for LA1; responsive to receiving the request, the owner node returning, to the owner node a response to the request, wherein the response includes a first address used to read first content stored at LA1 from back-end non-volatile storage and wherein the response conditionally includes the first content if the first content is cached locally on the owner node, wherein the response conditionally does not include the first content if the first content is not cached locally on the owner node; responsive to the non-owner node receiving the response, the non-owner node performs first processing including: determining whether the response includes the first content of LA1; responsive to determining the response includes the first content, the non-owner node returning the first content in response to the read I/O; and responsive to determining the response does not include the first content, the non-owner node using the first address of the response to read the first content stored at LA1 from back-end non-volatile storage, and then returning the first content in response to the read I/O operation; and the non-owner node caching the first address and the first content locally on the non-owner node.

In at least one embodiment, responsive to receiving the request from the non-owner node, the owner node can perform second processing including determining whether the first content stored at LA1 is cached locally on the owner node. Responsive to determining that the first content is not cached locally on the owner node, the owner node can performing third processing including: performing address resolution processing of LA1 using first mapping information to obtain the first address used to read first content stored at LA1 from back-end non-volatile storage; and returning the response that includes the first address without the first content. Responsive to determining that the first content is cached locally on the owner node, the owner node can perform fourth processing including: performing address resolution processing of LA1 using the first mapping information to obtain the first address used to read first content stored at LA1 from back-end non-volatile storage; and returning the response that includes the first address and includes the first content as cached locally on the owner node.

In at least one embodiment, the one or more criteria can include dynamic evaluation criteria based, at least in part, on one or more of the following: one or more cache-related metrics, one or more metrics regarding back-end resource consumption, one or more metrics regarding CPU resource consumption, cache size, cache hit ratio, back-end disk utilization, back-end controller utilization, back-end I/O workload, CPU utilization regarding main CPUs, average retention time denoting an average amount of time a data page remains in cache, and an average number of hits per data page while data pages remain in cache.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
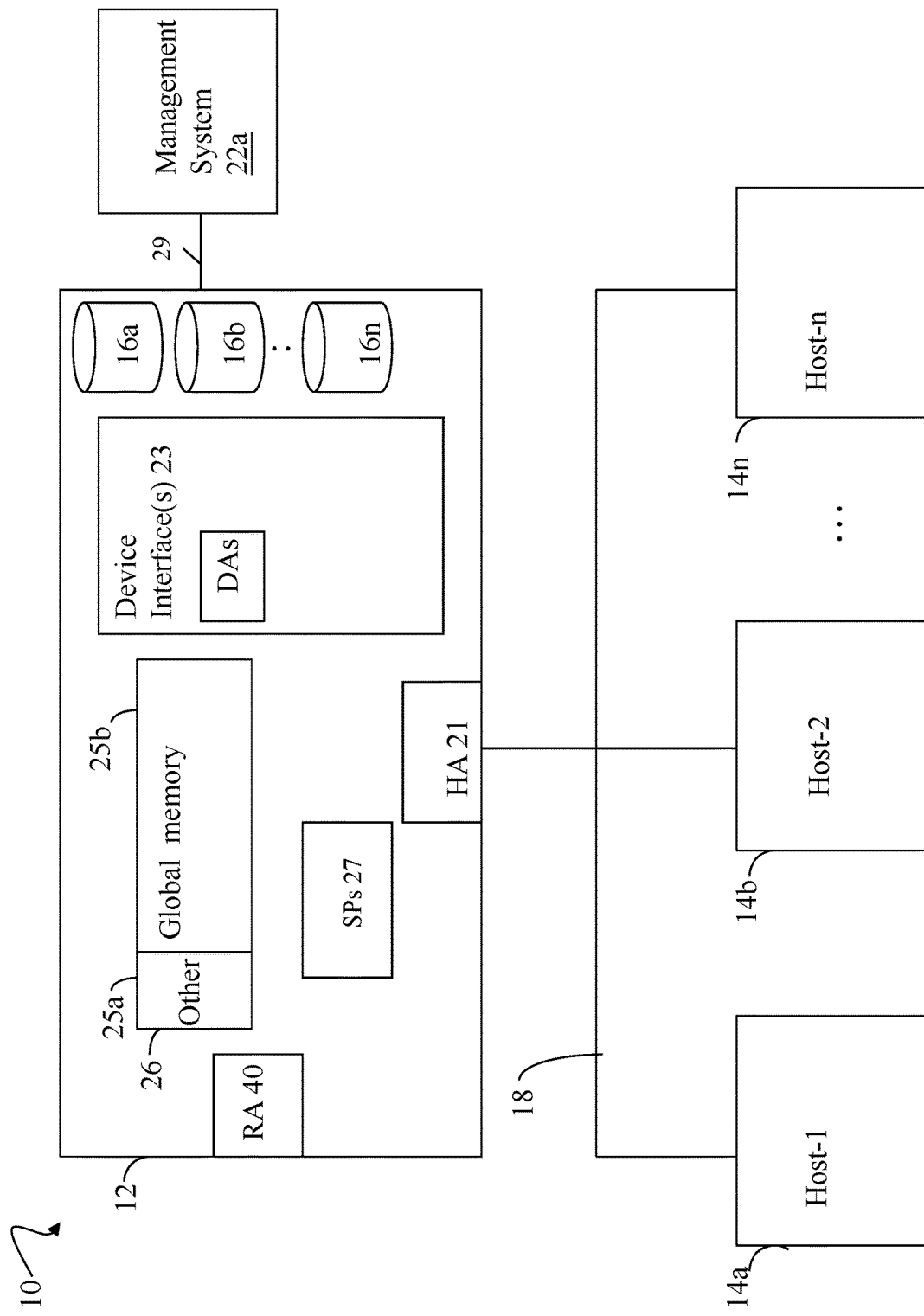
FIG. 1 is an example of components that may be included in a system in accordance with the techniques of the present disclosure.

Existing systems, such as data storage systems, can maintain and utilize a data cache to store frequently accessed pages of content or data such as user data of storage system clients. The data cache can be, for example, a form of fast volatile memory such as a volatile form of random access memory (RAM). In particular, the data cache can be used as a read data cache to store user data which is frequently read. For a read I/O requesting read data, the read data which is stored in the cache results in a cache hit or read cache hit. For a read cache hit, the requested read data can be retrieved from the cache and returned to the requester or originator of the read I/O. If the requested read data is not in the cache, a cache miss or read cache miss results where the requested read data can be retrieved from longer term backend (BE) non-volatile storage. A cache miss as compared to a cache hit results in an I/O performance penalty and increased I/O latency in order to service the read I/O and return the requested read data to the requester. The data cache can provide for read cache hits and optimized performance such as by providing for improved I/O latency and improved utilization of system resources. Generally, the data cache, and cache memory in general, can be characterized as a critical and expensive resource which can have a limited size or capacity. Accordingly, it is important for systems to utilize the data cache, and more generally cache storage, efficiently to provide for optimal performance.

In at least one existing system, mapping information can be used to map a logical address to a corresponding physical storage location or address storing the user data or content of the logical address. The mapping information can be a chain of metadata (MD) pages traversed to obtain the content of a logical address from its corresponding physical storage location or address on BE non-volatile storage. Thus, a read cache miss with respect to a read I/O requesting to read user data from a logical address can result in a cache miss with respect to the data cache noted above. Read cache miss processing can incur a performance penalty as noted above, at least in part, due to the traversal of the chain of MD pages of the mapping information. The MD pages of mapping information can also be stored on BE non-volatile storage. Thus, traversing the chain of MD page can include retrieving each MD page of the chain from BE non-volatile storage thereby incurring additional performance penalties to access. To further improve performance, a system can also store the mapping information, such as the chain of MD pages, in the cache. However, as with the user data and the limited size of the cache, not all mapping information or MD pages for all user data can be stored in the cache. As a result, accessing the multiple layers or levels of MD pages which can be needed for accessing the read data to service a read cache miss can result in additional cache misses thereby incurring an additional performance penalty to access any uncached MD pages of mapping information from BE non-volatile storage.

Some system can include multiple processing nodes where the multiple processing nodes can service I/Os. In such systems, cache usage can be even more inefficient across the multiple processing nodes since the same MD and/or user data or content for servicing I/Os can be cached in node-local caches of all the multiple processing nodes. For example, pages of the same user data and/or MD can be cached locally in caches of the multiple processing nodes. Additionally, due to the shared access of user data and MD among the multiple processing nodes, a synchronization or control mechanism can be used to coordinate access of the shared used data and MD among the nodes. For example, a locking technique can be used synchronize or generally coordinate access among the shared data and MD among the nodes. As another example, a technique can be used which provides a strong separation of responsibilities between the nodes in connection with the shared data and MD.

To improve upon the foregoing, an architecture can be utilized which partitions ownership of the logical address space of user data or content among the multiple processing nodes. In one such architecture, a node assigned a particular logical address can be designated as the owner of the logical address. In at least one system including multiple processing nodes, an I/O directed to a logical address can be received by either the owning node or a non-owning node. One challenge of the foregoing architecture is maintaining of data caches on the multiple nodes which can receive and service I/Os. In at least one system, the node A receiving a read I/O requesting to read data from a logical address LA1 can be expected to cache the requested read data even if the receiving node is not the owner of the logical address LA1. However, the peer node B which owns the logical address LA1 can also cache content stored at the logical address LA1, where the cached content on owning node B can be an updated version of content written to the logical address LA1. In this manner, non-owner node A can cache first content C1 as stored at LA1 while owner node B subsequently receives a write to store updated content C2 at LA1 thereby resulting in node B caching updated content C2 as stored at LA1. Thus, coherency of the data caches of the nodes A and B such as with respect to content stored at LA1 cannot be guaranteed. Put another way, without further coordination and synchronization of data caches on the multiple nodes, it is possible for the node B, which owns the logical address LA1, to update its cached content C2 stored at the logical address LA1 and thus silently invalidate the cached content C1 for the logical address LA1 as stored in the non-owning node A's cache. More generally, in scenarios where both nodes A and B can service I/Os directed to the same logical addresses and where both nodes A and B can cache content for the same logical addresses, coherency of data caches of nodes A and B cannot be guaranteed without some additional technique to maintain cache coherency between node local caches of nodes A and B. In such scenarios, some systems can invalidate the cached content on the non-owning node A for LA1. As another option, some systems can simply choose to only cache content stored at a logical address on the single node that owns the logical address. Thus, in this latter case, nodes do not cache content of logical addresses that they do not own. However as a consequence, when the non-owning node A receives a subsequent read I/O to read content stored at LA1 (where LA1 is owned by node B as described above), a read cache miss results and thereby incurs a performance penalty in order to read the content stored at LA1 from BE non-volatile storage.

Assuming that approximately 50% of I/Os are handled by a non-owning node, the foregoing can generally result in data caching inefficiencies and/or incurring undesirable performance penalties such as with read cache misses.

Accordingly, described in the present disclosure are techniques that overcome the foregoing drawbacks and provide for improved and efficient cache usage, and also improvements in performance.

In at least one embodiment, the techniques of the present disclosure can provide for an improvement in data cache efficiency and an increase in the data cache hit rate in a multiple node system where each of the multiple nodes of the system can receive I/Os and can service such received I/Os.

In at least one embodiment, an architecture can be utilized which partitions ownership of a logical address space of user data or content among the multiple processing nodes of the storage system. For example, the logical address space can correspond to one or more volumes, or more generally, one or more storage objects. The storage objects can include logical devices or volumes, files, file systems, directories, and/or sub-portions of such storage objects.

In at least one embodiment, a node assigned a particular logical address, or a subrange of logical addresses, can be designated as the sole owner, respectively, of the logical address or subrange. In at least one embodiment, a node which owns the logical address can perform address resolution processing (sometimes referred to herein as simply resolution processing) for the logical address using the mapping information of MD pages and can traverse a portion, or at least some, of the chain of MD pages to obtain an IDP (indirect pointer) to the requested read data.

In at least one embodiment, the logical address space can be partitioned or divided into slices where each slice corresponds to a sub-volume logical address portion. In this manner, a volume or logical device, or more generally a storage object, can have an associated logical address space which is partitioned into multiple slices. Each such slice can be assigned to a single one of the nodes as the slice's owner.

In at least one embodiment, multiple different techniques that can be used in connection with data caching in a system with multiple nodes. In at least one embodiment using one of the techniques, caching of user data stored at a logical address is allowed on both the owning node of the logical address and the non-owning node of the logical address. In such an embodiment using the techniques of the present disclosure, data integrity with respect to cached content on the non-owning and owning nodes can be guaranteed without incurring undesirable processing costs.

The techniques of the present disclosure include three methods M1, M2 and M3 denoting 3 different techniques or methods of data caching which can be considered for use in at least one embodiment. In at least one embodiment, a selected one of the methods M1, M2 and M3 can be applied for a read I/O directed to a logical address LA where the read I/O is received by a non-owner node that does not own LA. In at least one embodiment, when the read I/O directed to LA is received by the non-owner node that does not own LA, the non-owner node can issue a remote procedure call (RPC) to the owner node to perform processing including any needed resolution processing using mapping information of MD pages associated with the LA. The particular processing performed by both the owner node and the non-owner initiator node can vary with the particular one of the methods M1, M2 or M3 that is applied. In at least one embodiment of the method M1, caching of content or data stored at logical addresses can be allowed by an owner node but not allowed by a non-owner node. In at least one embodiment of the method M2, caching of content or data stored at logical addresses can be allowed by both owner and non-owner nodes. In at least one embodiment of the method M2, cache coherency of content cached on both owner and non-owner nodes can be provided using an address hint or more generally a hint corresponding to the physical storage location or address storing content for a particular logical address LA. In at least one embodiment of M2, the hint can be an IDP used to read the content for the LA from the physical storage location on BE non-volatile storage. In at least one embodiment of M2, the hint can be an address of, or pointer to, the physical storage location on BE non-volatile storage that contains the content for the LA. In at least one embodiment of the method M3, caching of content or data stored at logical address can be allowed by the owner node but not allowed by the non-owner node. In at least one embodiment of the method M3 where the read I/O directed to LA is received by the non-owner node, the owner node of LA can perform an additional opportunistic read of the content of LA from the BE non-volatile storage in order to have the content for LA cached locally on the owner node. Such an opportunistic read can be performed by the owner node of LA in anticipation that the owner node may receive a subsequent read I/O directed to LA. In this manner, the owner node would be able to service the subsequent read I/O directed to LA using its local cached copy of content stored at LA (e.g., read cache hit) rather than experiencing a performance penalizing read cache miss on the owner node for the "yet to be received" subsequent read I/O. In this manner, M3 can include the additional cost of the owner node performing such an opportunistic or speculative read when there is no guarantee that the cached content for LA stored on the owner node will be utilized or referenced before being removed or evicted from the owner node's cache.

In at least one embodiment, selection of one of the multiple caching techniques can be performed at development or installation time based on one or more criteria, where the selected caching technique can be applied in a constant or static manner such that the selected technique does not vary or change at runtime during operation of the system. In at least one embodiment, the criteria used to select the caching technique can include one or more of the following: optimization target or goal, size of memory dedicated to data cache, expected I/O patterns and/or expected resource utilization. In at least one embodiment, the multiple caching techniques can include the methods or techniques M1, M2 and M3.

In at least one embodiment, selection from among multiple caching techniques can be performed dynamically at runtime in an adaptive manner such as based, at least in part, on one or more metrics that can change over time in the system. In at least one embodiment, the one or more metrics can include: actual or measured resource utilization and/or cache hit rate. In at least one embodiment, the one or more metrics can be provided as feedback or inputs to processing which can select a particular one of the multiple caching techniques to be utilized. In at least one embodiment, evaluation and selection of a particular caching technique can be performed periodically and/or responsive to defined conditions or occurrences of events in the system. In at least one embodiment, the multiple caching techniques can include the methods or techniques M1, M2 and M3.

In at least one embodiment of M2 as a caching technique which allows caching of content by both owning and non-owning nodes with respect to a logical address, if the node receives a read I/O directed to the logical address not owned by the receiving node, the receiving node can perform processing to service the read I/O. A node receiving an I/O operation such as the read I/O can sometimes be referred to as an initiator node. In at least one embodiment, when an initiator node receives the read I/O directed to the logical address it does not own, the initiator node can send a request, such as an RPC, to the owning peer node to perform address resolution processing for the logical address. The node which owns the logical address can perform address resolution processing using the corresponding mapping information for the logical address. The address resolution processing performed by the owning node can include the owning node using the mapping information of MD pages and traversing a portion or at least some of the chain of MD pages to obtain an IDP to the requested read data. The owning node can return the IDP of the read data to the non-owner initiator node. If the non-owning initiator node (which receives the returned IDP in response to the RPC) also has a cached copy of content stored at the logical address and a corresponding IDP, the initiator node can compare the returned IDP (returned from the owning node) to its local corresponding IDP to determine whether the foregoing two IDPs match. In this manner, the corresponding IDP of the cached content for the logical address can be used by the non-owner initiator node as a hint regarding the validity of the cached content. If the foregoing two IDPs match, the non-owner initiator node can determine that its cached content for the logical address is valid, and can thereby return its local cached content for the logical address in response to the read I/O. If the foregoing two IDPs do not match, the initiator node can determine its local cached content for the logical address is invalid. In this latter case, the non-owner initiator node can: use the returned IDP from the owning node to read the current content stored at the logical address from BE non-volatile storage; store the current content obtained from BE non-volatile storage in the non-owner initiator node's local cache along with the returned IDP; and return the current content in response to the read I/O. In this manner, the returned IDP can become a new or revised hint subsequently used by the non-owner initiator node to determine the validity of the current content for the logical address where the current content is cached in the non-owning initiator node.

In at least one embodiment, the mapping information can include a multi-level tree or hierarchical structure of MD pages. In at least one embodiment, the number of levels in the tree or structure can be three or more. In at least one embodiment, the tree can be a B+ tree data structure where each non-leaf node can include up to N children. Thus N can be a specified maximum allowable number of child nodes and N can be 2 or more.

In at least one embodiment in which the mapping information includes a 3 level tree of MD pages, each slice, which is owned by one of the nodes, can correspond to a logical address space subrange associated with a MD leaf page of the tree. The tree can also include a mid MD page level of mid MD pages and a top MD page level of top MD pages. Each mid MD page can include addresses of, or pointers to, MD leaf pages. Each top MD page can include addresses of, or pointers to, MD mid pages.

In at least one embodiment, the storage system can include two nodes and a logical address space can be partitioned into two sets of slices, where each slice set is owned by only a single one of the nodes. The logical address space can be partitioned into consecutive slices which correspond to consecutive, contiguous sequential logical address subranges of the logical address space. The slices can be assigned a unique integer identifier or ID such as beginning with one (1), where even slices can be included a first slice set owned by node A, and where odd slices can be included in a second slice set owned by node B. Each slice can correspond to a logical address subrange size such as 2 MBs. In at least one embodiment, each MD page of the tree of mapping information can include 512 entries, where each entry is a pointer or address. Each non-leaf MD page entry can be a pointer to, or address of, another MD page. Each leaf MD page entry can be a pointer to, or address of, an entry in a VLB (virtual layer block) page. In such an embodiment where each MD leaf corresponds to a 2 MB logical address space portion, each MD leaf entry can correspond to a 4K page of content or stored user data. Each MD leaf entry can include the address of a VLB entry, where the VLB entry further includes another pointer to or address of non-volatile storage containing the content or user data.

In at least one embodiment, a node which receives an I/O operation can be referred to as the initiator node with respect to that particular I/O operation.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, ISCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2A:
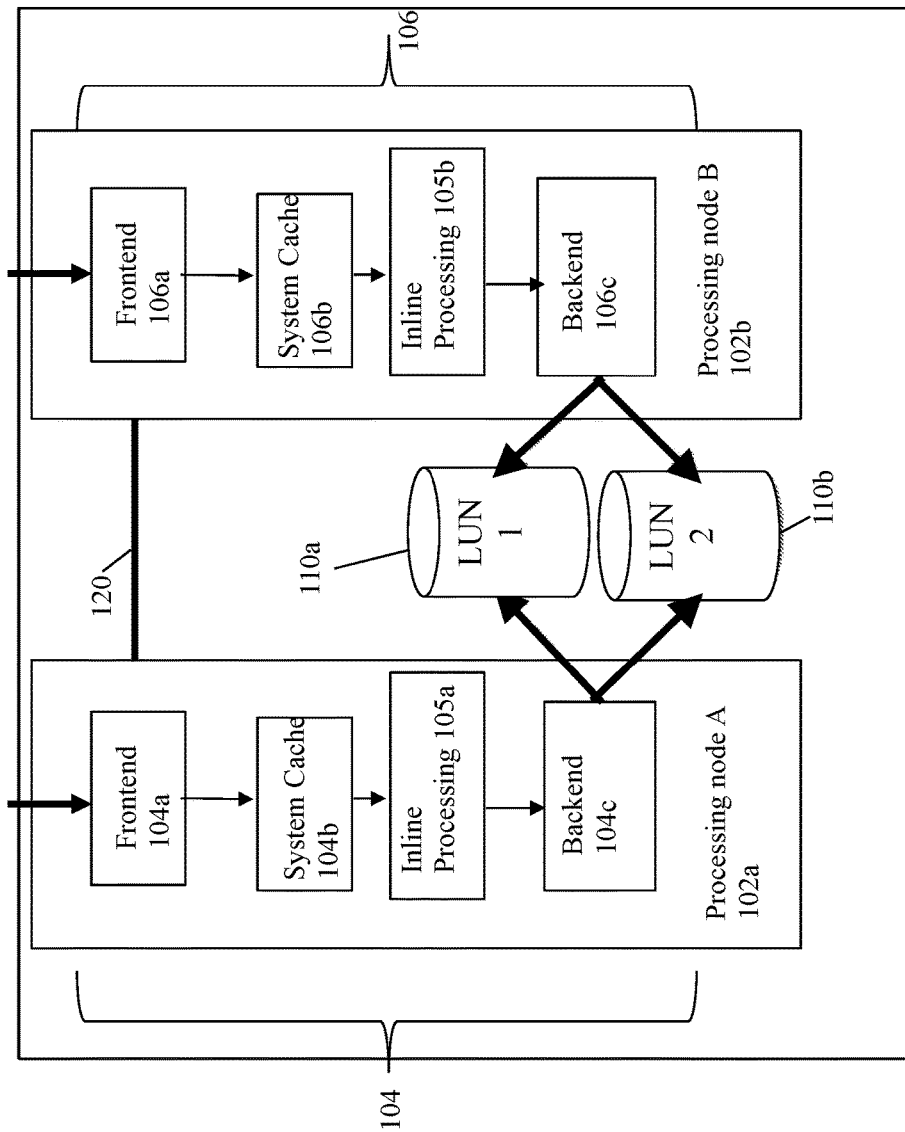
FIG. 2A is an example illustrating the I/O path or data path in connection with processing data in at least one embodiment in accordance with the techniques of the present disclosure.

With reference to the FIG. 2A, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2A is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102a-b in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2A, for write operations, latency can be affected by the amount of time taken to store the write data in the log where the write data is visible to both nodes or controllers of the system.

Consistent with other discussion herein, the log file used to log user operations, such as write I/Os, can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
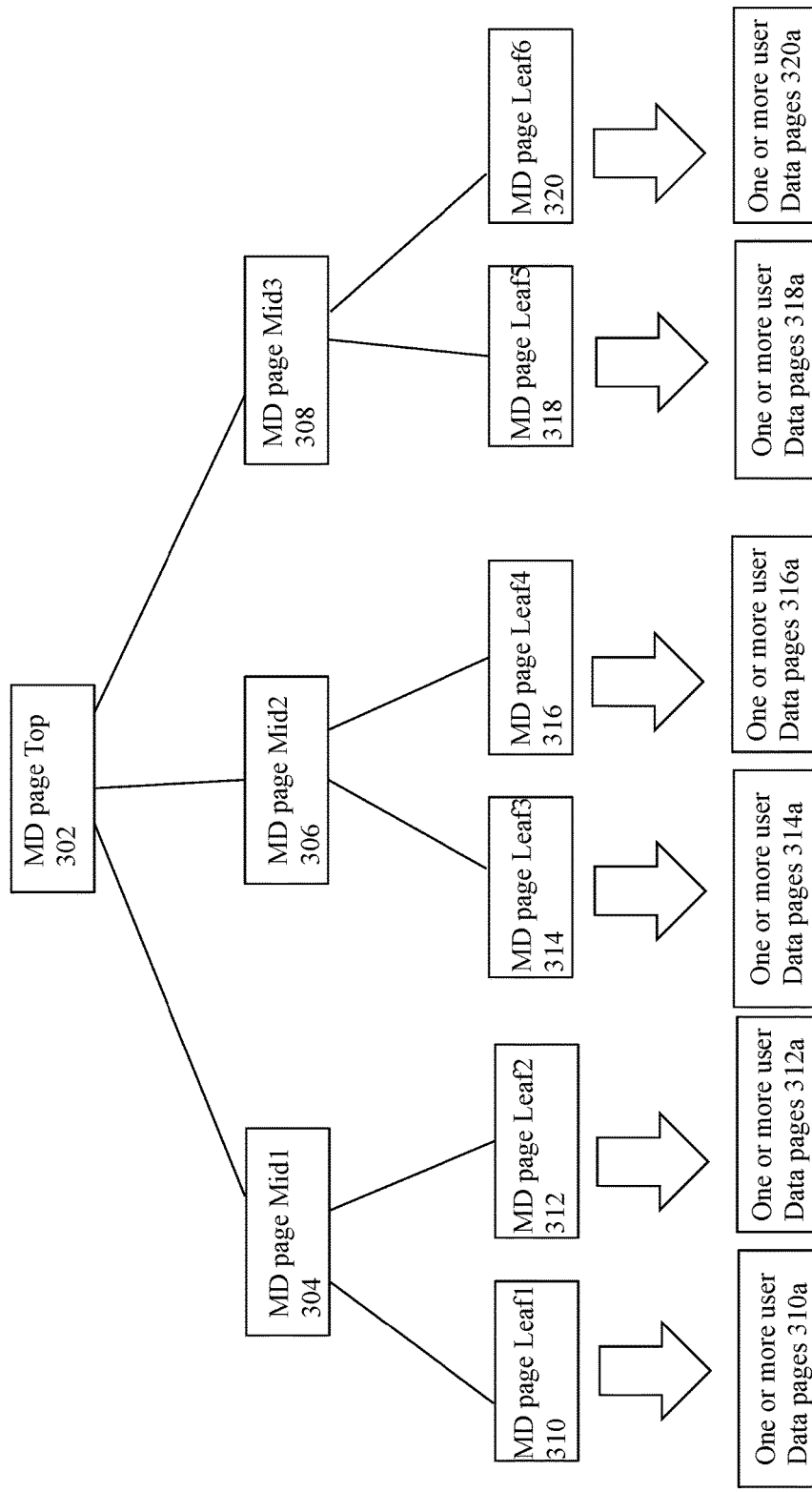
FIGS. 3, 4, 5, and 6 are examples of mapping information in the form of a metadata structure that can be used in connection with mapping logical addresses to physical addresses or storage locations in at least one embodiment in accordance with the techniques of the present disclosure.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Before describing in more detail the mapping information of MD pages that can be used in an at least one embodiment to map a logical address to a corresponding physical storage location or address, further details are described in connection with using a log for logging user or client operations, such as write I/Os.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
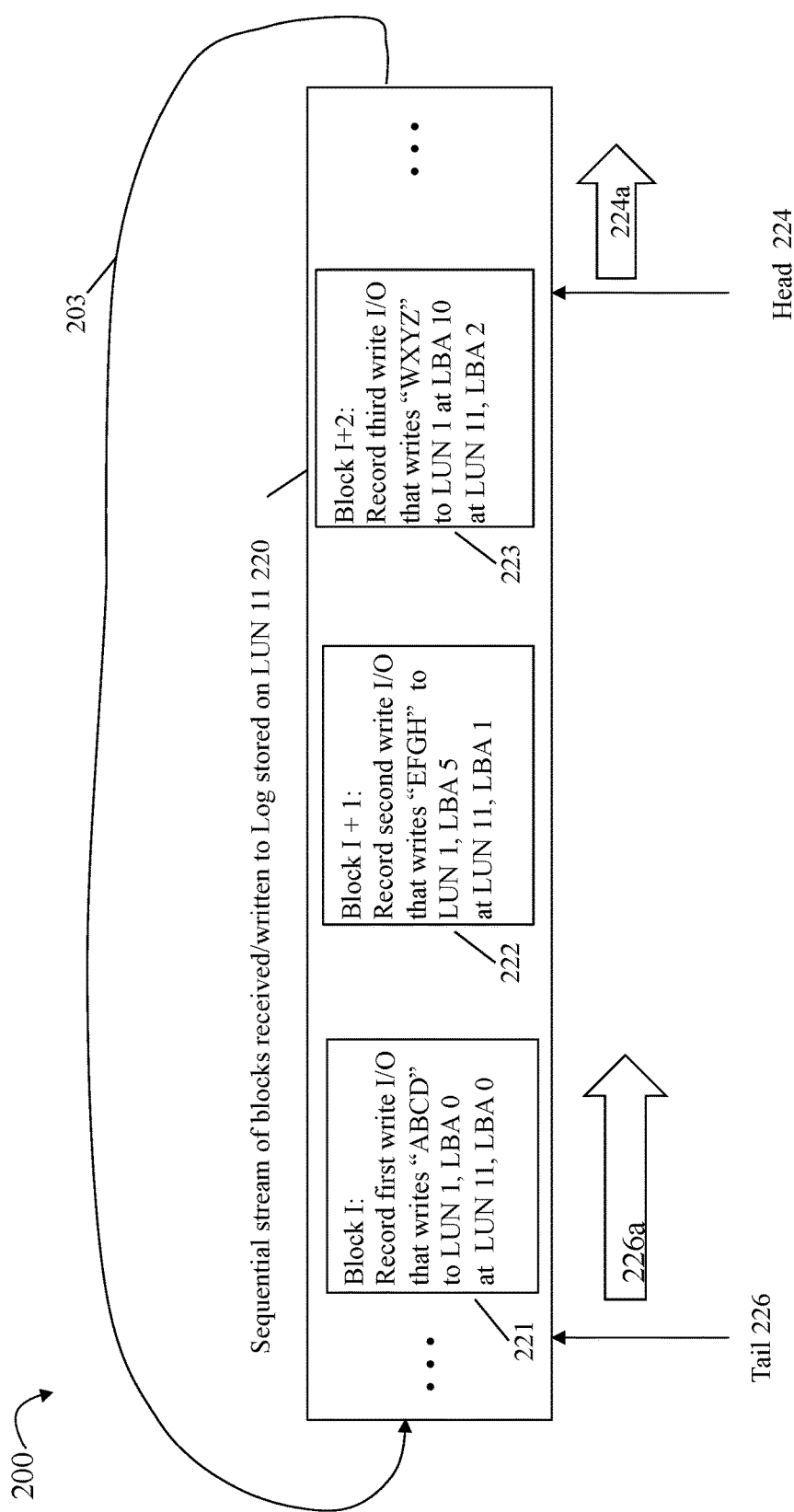
FIGS. 2B, 2C and 2D are examples illustrating use of a log or journal recording client operations in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
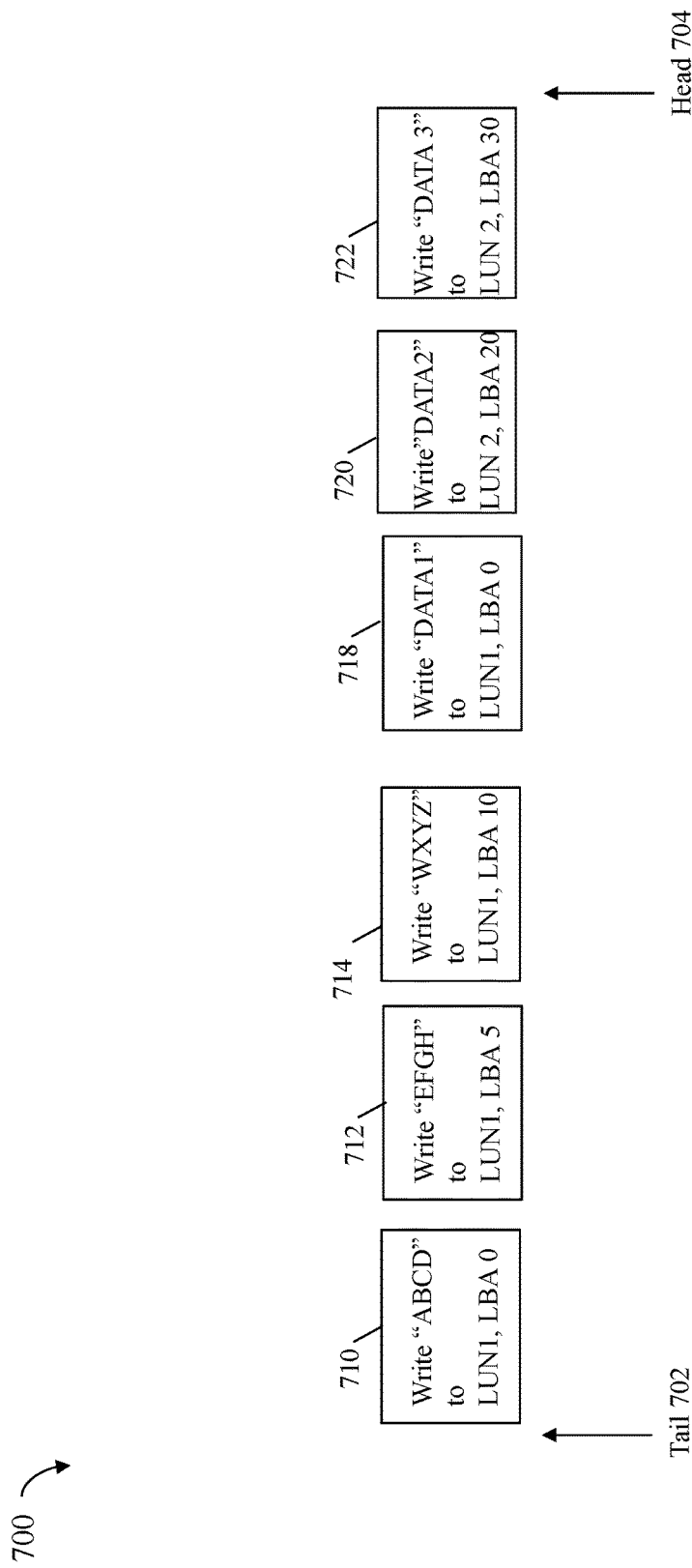

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
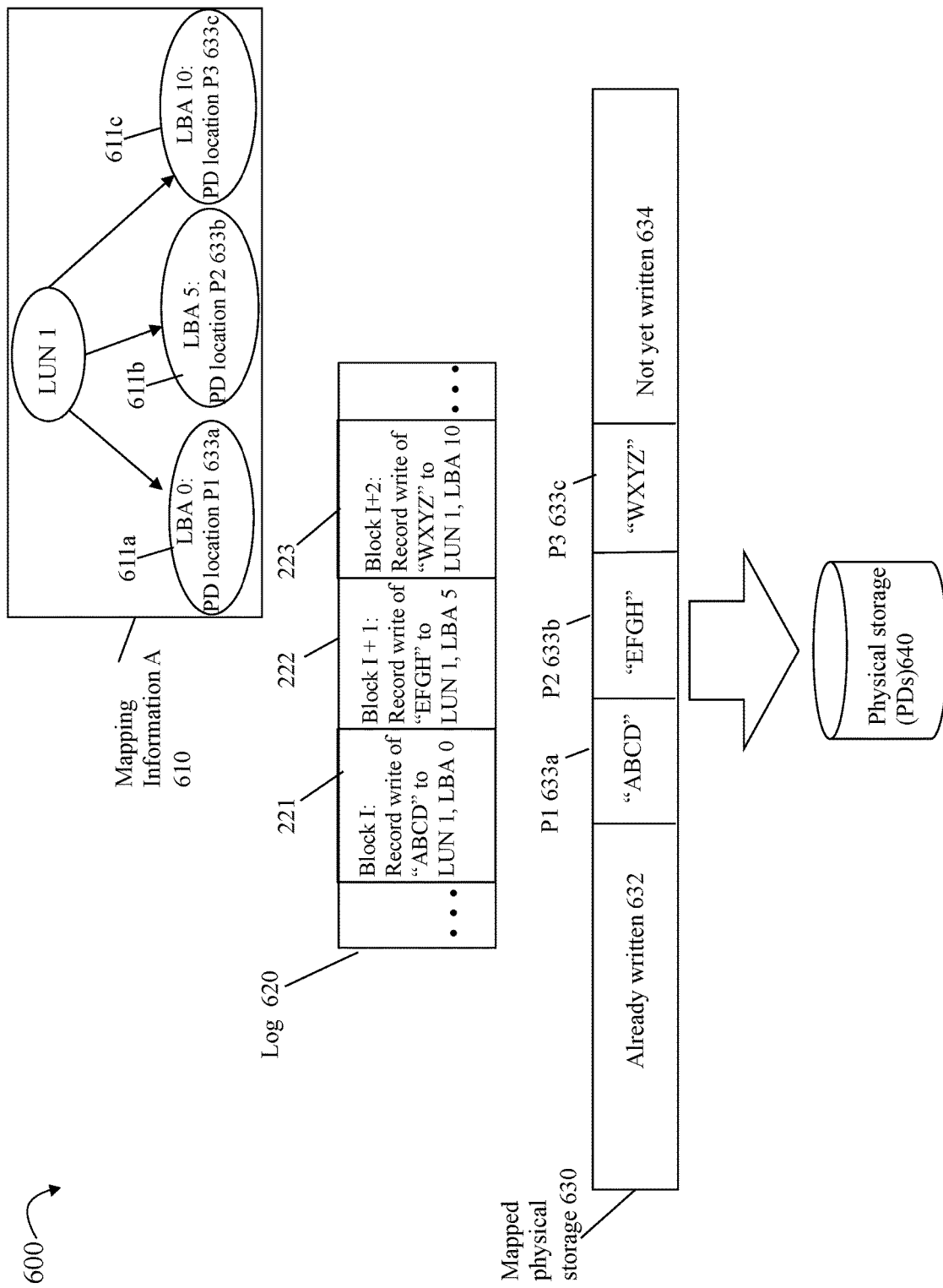

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640.

The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

Referring to FIG. 3, shown is an example 300 of a tree of MD pages that can be used in an embodiment in accordance with the techniques herein. The example 300 includes a tree of MD pages denoting the mapping structure as discussed above with 3 levels-a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
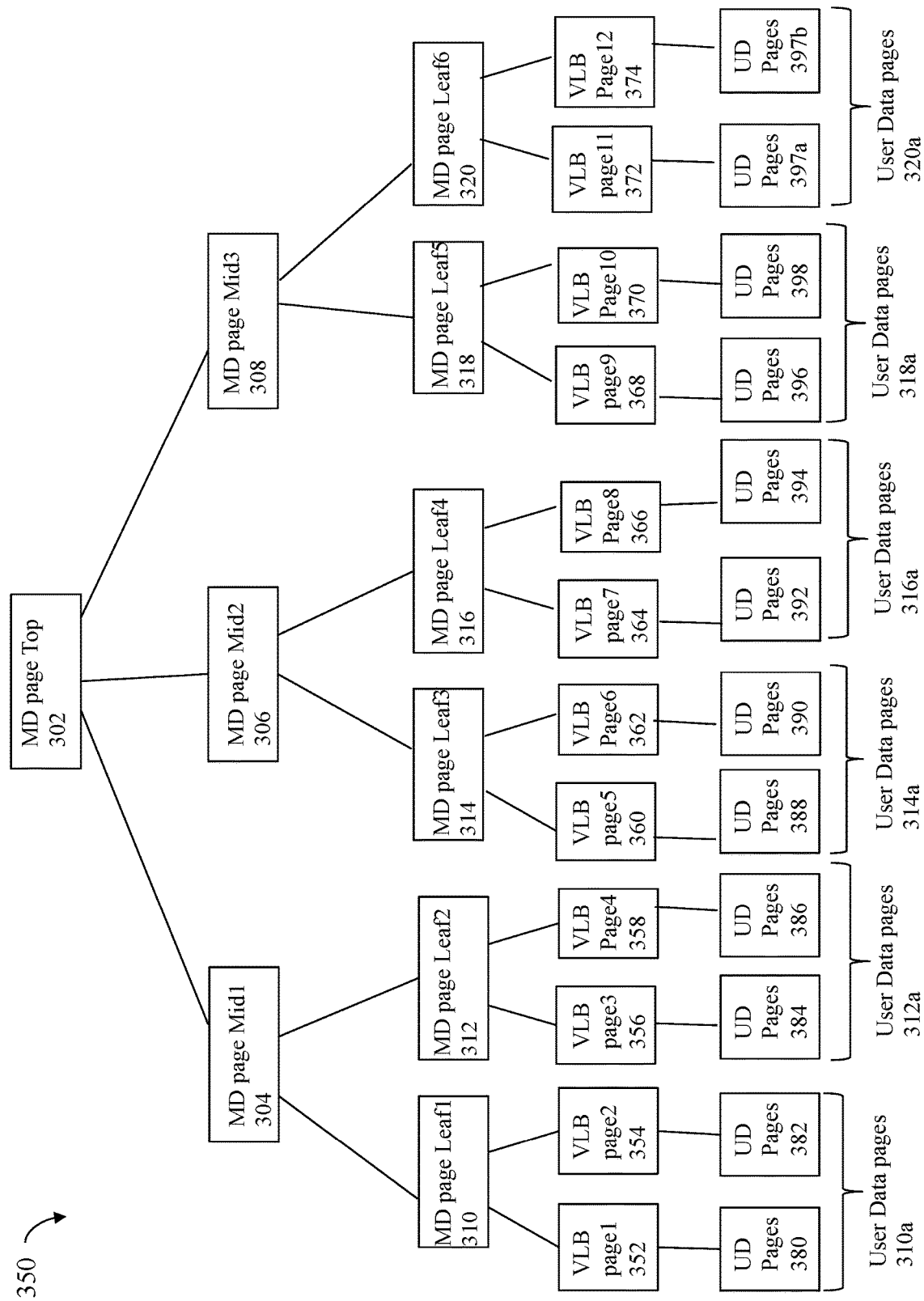

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of a VLB (virtualization layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages-MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559. The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
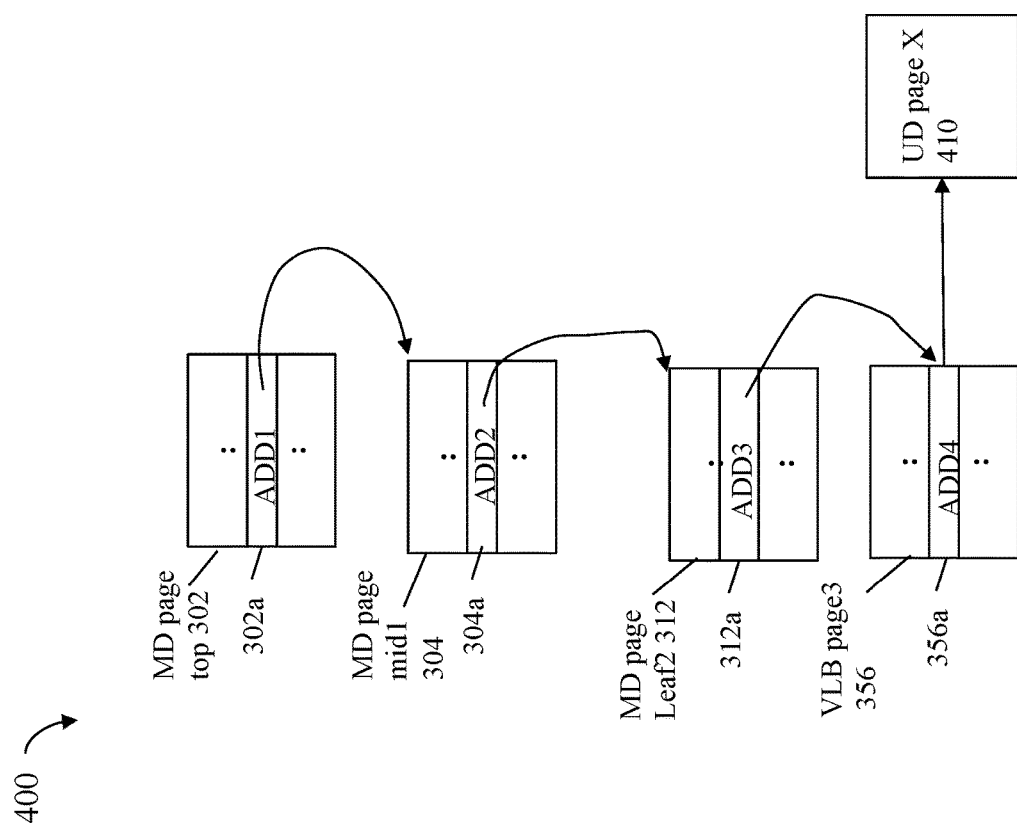

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the particular mid level MD page, such as MD page mid1 304, that is accessed next in the sequence.

Continuing with the example 400, the MD page mid1 304 can be accessed where the location 304a is read to obtain the address or pointer ADD2 from location 304a. In at least one embodiment, the particular entry or offset 304a of the MD mid1 page can be determined based on the logical address being mapped. The address or pointer ADD2 can then be used to identify the particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies the MD page leaf 2 312. If the MD page 312 is not already in cache, the on-disk copy of the MD page 312 on a PD can be read to obtain the content of location 312a. In at least one embodiment, the particular desired entry or offset 312a of the MD leaf2 page 312 can be determined based on the logical address being mapped. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
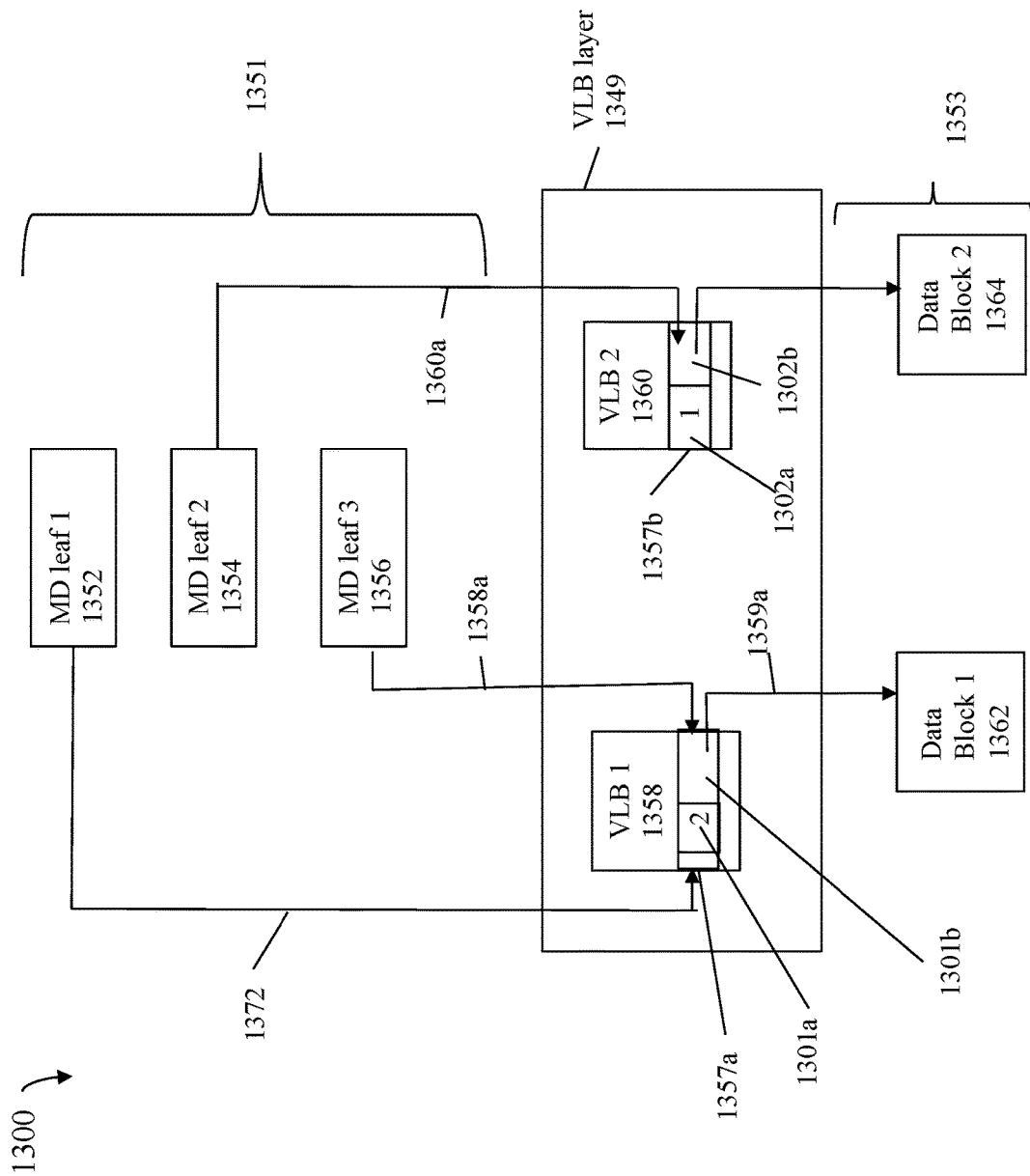

Referring to FIG. 6, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357a of the VLB 1358. The two MD leaf nodes 1352 and 1356 both referencing the same data block 1362 indirectly through use of the same VLB entry 1357a can be a mapping resulting from data deduplication processing. In the example 1300, MD leaf node 1354 points to the entry 1357b of the VLB 1360 whereby the entry 1357b of the VLB2 1360 then further references or points to the data block 1364. The data blocks 1362, 1364 can denote user data blocks as described herein.

The element 1358a denotes a pointer to, or address of, the entry 1357a in the VLB 1358 used in connection with obtaining the data block 1362 stored on a particular LUN and LBA of the LUN. The pointer 1358a can be used as the virtual or indirect pointer in connection with obtaining the data block 1362. In at least one embodiment, the VLB 1358 can be a VLB page or node as described herein. Thus, in such an embodiment, the virtual or indirect pointer 1358a can be a pointer to the entry 1357a of the VLB structure 1358, where the entry 1357a can further include fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1372 denotes a pointer to, or address of, the entry 1357a in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357a of the VLB structure 1358, where the entry 1357a can further include the fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1360a denotes a pointer to, or address of, the entry 1357b in the VLB 1360 used in connection with obtaining the data block 1364 stored on a particular LUN and LBA of the LUN. The pointer 1360a can be used as the virtual or indirect pointer in connection with obtaining the data block 1364. Thus, in such an embodiment, the virtual or indirect pointer 1360a can be a pointer to the entry 1357b of the VLB structure 1360, where the entry 1357b can further include the fields 1302a and 1302b. The field 1302b can be a pointer to, or address of, the user data block 1364. The field 1302a can be a reference count or counter indicating the number of instances of, or references to, the particular data block 1362 (e.g., data block pointed to by 1302b).

The reference count 1301a can be initialized to 1 when a first or initial instance of the associated data block 1362 is stored. In this example, the reference 1301a is 2 indicating that there are 2 instances of the data block 1362 and thus 2 references to the data block 1362. In this case, the are 2 instances of the data block 1362 in stored user data. The instances denoted by the reference count 1301a include all deduplicated instances corresponding to entries of the MDL leaves 1352, 1356 that respectively point 1372, 1358a to the VLB entry 1357a associated with the single copy of the data block 1362.

The reference count 1302a can be initialized to 1 when a first or initial instance of the associated data block 1364 is stored. In this example, the reference 1302a is 1 indicating that there is 1 instance of the data block 1364 and thus 1 reference to the data block 1364. The instances denoted by the reference count 1302a generally include any/all deduplicated instances associated with the single copy of the data block 1364. However, in this example, there is only a single reference to, and single instance of, the data block 1364 in stored user data. In particular, the MD leaf 1354 references or points (1360a) to the VLB entry 1357b associated with the single copy of the data block 1364.

In at least one embodiment, each VLB can be a VLB page or node as described herein including multiple entries, such as 512 entries, where each such VLB entry can include one or more fields of information such as the address or pointer to one of the data blocks such as 1362 or 1364.

In at least one embodiment, each MD leaf can have multiple entries, such as 512 entries, each corresponding to a different logical address in a logical address range corresponding to the MD leaf.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-6.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-6.

In at least one embodiment, the MD or mapping information used in connection with stored user data can be stored on non-volatile storage, such as on the BE PDs of the appliance or data storage system. At least some of the MD pages of mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at new subsequent physical storage locations on the BE PDs. Additionally, the MD or mapping information corresponding to the logged writes being flushed can also be accordingly updated to reference the new subsequent physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6.

In at least one embodiment, updates or modifications to the MD pages of the mapping structure described in connection with the FIGS. 3-6 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-6 can be persistently stored in a MD page store on the BE PDs of the system. In some contexts herein, the copy of a MD page as stored in the MD page store on the BE PDs can also be referred to herein as the on-disk copy of the MD page.

Workflows for some implementations to perform reads and writes to the MD page can include loading the entire MD page into the cache or volatile memory of a node, if the MD page is not already in the cache or volatile memory of the node.

A data storage system can perform different data services such as data deduplication discussed above to remove redundant or duplicate copies of data or content by storing a single copy of the user data and having multiple references or pointers to the same stored single copy. For example, the content or user data can be stored in a single data block that can be referenced by multiple logical addresses where the content of the data block is stored at all the multiple logical addresses.

In connection with data deduplication, the data block that includes the user data or content can be associated with a MD page, where the MD page can include a reference count denoting the number of references to the data block. For example reference is made back to FIG. 6 and discussion above regarding FIG. 6. In at least one embodiment using the MD structures as described, for example, in connection with FIGS. 3, 4, 5, and 6, the reference count associated with a data block can be included in an entry of a VLB page associated with the data block. For example with reference to FIG. 6, the VLB entry 1357a includes a field 1301a with the reference count=2 for the associated data block 1362; and the VLB entry 1357b includes a field 1301a with the reference count=1 for the associated data block 1364.

The reference count such as of the VLB entries 1357a, 1357b, can be updated in connection with deduplication processing. For example, deduplication processing can be performed on new data written to a target logical address by a write I/O operation. Deduplication processing can determine that the new data is a duplicate of existing data stored in a data block. Rather than store another copy of the same data in another data block, deduplication processing can include alternatively having the target logical address reference the single existing copy of the data as stored in the data block. As part of deduplication processing, the reference count associated with the single existing copy of the data block can be incremented as each additional reference to the same data block is made. In a similar manner, the reference count can be decremented as content of a particular logical address is modified or deleted to no longer be considered a duplicate of the single existing copy of the data block.

Consistent with other discussion herein in at least one embodiment, updates or modifications can be with respect to user data or stored content modified by client or host write I/Os as well as with respect to metadata, such as updates or modifications to the MD structure or mapping information described above. As noted above in at least one embodiment to increase performance, the updates to user data can be stored (e.g., persisted temporarily) in a log or journal logging client or host writes, and the updates to the MD or mapping information can be stored (e.g., persisted temporarily) in a metadata log. One characteristic of a log structured system, such as in connection with the metadata log and log of client updates or writes, is that updates or modifications (which are recorded in an associated log and then flushed to long term storage of the BE PDs) may not physically overwrite or update the same BE PD physical location storing the old data or existing content (e.g., no physical in place update). Rather, the newly written or updated data is typically written to a different physical location on the BE PDs. Thus, the BE PDs can retain the valid old data in the original physical location for some time before being reclaimed for reuse by garbage collection processing.

Garbage collection can be performed in connection with storage management of the BE PDs to reclaim and reuse free or invalidated physical storage as new data is written. In some cases, "holes" of storage storing old, unused or invalid content can be interspersed among portions of storage storing current valid content. Garbage collection can include performing processing which allows multiple holes of storage including unused or invalid data to be compacted into a single larger contiguous storage portion which can then be reused. Thus garbage collection processing can include moving first storage portions of valid data or content interspersed among holes of invalid content from a source to a target location to thereby make free or available a larger contiguous storage portion including the holes of invalid content.

Consistent with other discussion herein, an entry from the log of user or client updates (sometimes referred to as the UD (user data) log) can be an update to a logical address (e.g., LUN and LBA) which writes content to a UD page. Flushing the entry can include destaging the updated UD page to a backend storage location on non-volatile storage (e.g., BE PD location). Additionally, flushing and destaging the entry from the UD log can include updating the corresponding MD pages which map the logical address to its corresponding BE PD location including the content stored at the logical address. In at least one existing system, the mapping information including MD pages as described herein can thus be updated. For example, such updating of the mapping information can include updating any of the top, mid and leaf MD pages used in connection with mapping the logical address to the BE PD location including the content stored at the logical address. In at least one existing implementation, updating the corresponding mapping information and MD pages can include loading all the MD pages into the cache if any such MD pages are not already in cache. The MD pages of the mapping information can be characterized as a chain forming an access sequence of top MD page, mid MD page, and leaf MD page. The mapping information can also include a VLB where a MD leaf page entry can reference a VLB entry, and the VLB entry can reference a physical location on BE non-volatile storage.

Described below are techniques of the present disclosure which provide for improved and efficient cache usage and also improved storage system performance.

In at least one embodiment, a user data (UD) or client logical address, which can be the target logical address of a client I/O operation such as a read operation, can be uniquely identified using the volume or LUN ID (identifier), or more generally a storage object or resource ID, in combination with the LBA or offset of the logical address.

The techniques of the present disclosure are described below in an exemplary embodiment of a dual node active-active data storage system or cluster where the two nodes are connected by a network link or connection as discussed above. However more generally, the techniques of the present disclosure can be used in connection with a data storage system including more than two nodes, and generally any suitable number of multiple nodes.

Figure 7:
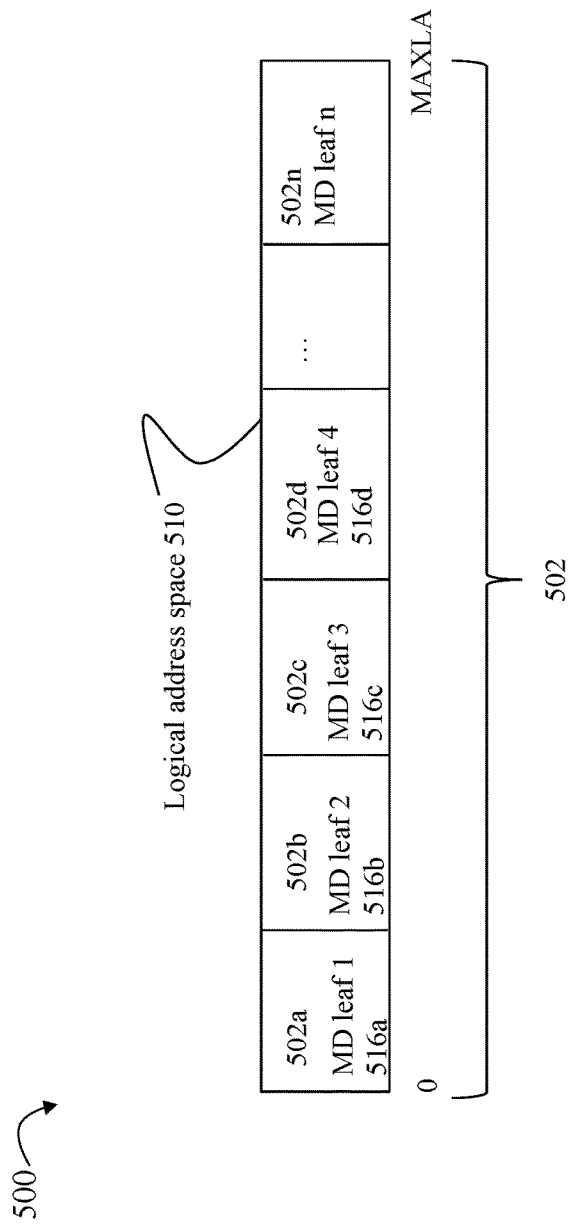
FIG. 7 is an example illustrating a partitioned logical address space in at least one embodiment in accordance with the techniques of the present disclosure.

Referring to FIG. 7, shown is an example 500 illustrating a partitioned logical address space into slices in at least one embodiment in accordance with the techniques of the present disclosure.

The example 500 includes the logical address space 510. The logical address space 510 can denote a contiguous logical address range such as of one or more volumes or LUNs.

In at least one embodiment in accordance with the techniques of the present disclosure, the user data (UD) logical address space 510 can be partitioned into multiple slices or portions 502, such as denoted by multiple logical address slices or portions 502a-n. Each of the logical address slices or portions 502a-n can be a same size, such as 2 MB (megabytes), or any other suitable size. In at least one embodiment, each logical address space portion or slice 502a-n can be 2 MB to correspond to the logical address subrange of each single MD leaf of the MD leaf layer 516. The multiple address space slices or portions 502a-n can then be divided among the two nodes such that a first of the nodes, such as node A, is assigned ownership of a first slice set of the logical address slices or portions 502; and a second of the nodes, such as node B, is assigned ownership of a second slice set of logical address slices or portions 502.

The logical address space 510 can denote an associated logical address space of any one or more storage objects or storage space. The one or more storage objects can include, for example, one or more volumes, logical devices or LUNs; one or more sub-volume or sub-LUN portions; one or more file systems; one or more files; one or more sub-file system portions (e.g., each file system portion being less than an entire file system); and/or one or more vvols or virtual volumes used by one or more virtual machines. Generally, the logical address space 510 can denote a contiguous range of consecutive logical addresses so that each of the logical address slices or portions 502a-n is mapped to a unique subrange of consecutive contiguous logical addresses of the logical address space 510. For example, consider an embodiment where each of the slices or logical address portions 502a-n is 2 MB in size. In this case, the slice 502a can include all logical addresses x in the subrange $0 \leq x < 2$ MB (e.g., (0-2 MB]); the portion 502b can include all logical addresses x in the subrange $2$ MB$\leq x < 4$ MB (e.g., (2 MB-4 MB]); and so on.

The logical address slices or portions 502 can be partitioned into the two slice sets where each slice or logical address portion 502-n is included in only one of the two slice sets. In at least one embodiment, the logical address slices 502 can be partitioned equally as possible between the two nodes A and B although other unequal partitionings can also be suitable for use with the techniques of the present disclosure.

In at least one embodiment, the logical address slices of the contiguous logical address space 510 can alternate in connection with ownership assignment among the nodes A and B. In this manner, ownership of slices or portions of the logical address space 510 can be interleaved among the nodes A and B. For example with reference to FIG. 7 the slices 502a-n can correspond to consecutive contiguous logical address subranges of the logical address space 510, where 0 can denote the starting or lowest logical address of 510 and MAXLA can denote the ending or highest logical address of 510. Assuming each of the slices 502a-n is 2 MB and thus corresponds to a different MD leaf, the first 2 MB subrange (e.g., logical addresses (0 through 2 MB]) of 510 can correspond to the slice 502a; the second 2 MB subrange (e.g., logical addresses (2 MB through 4 MB]) of 510 can correspond to the slice 502b; the third 2 MB subrange (e.g., logical addresses (4 MB through 6 MB]) of 510 can correspond to the third slice 502c; the fourth 2 MB subrange (e.g., logical addresses (6 MB through 8 MB]) of 510 can correspond to the fourth slice 502d, and so on, for each slice in 510.

In at least one embodiment, each slice 502a-n can be assigned a corresponding unique slice identifier or ID which is an integer ID in a consecutive integer sequence corresponding to a relative position in a consecutive and contiguous ordering of the logical address subranges of the slices. For example, the slice 502a has an ID of "1", the slice 502b has an ID of "2", the slice 502c has an ID of "3", and so on, as the associated logical address subranges of the slices increase. In at least one embodiment, ownership of a slice of the logical address space 510 can be derived from or based on the relative consecutive ordering or placement of the slice itself. For example, as noted above, the owner of a logical address slice can be based on whether the slice has an associated even or odd slice ID. In at least one embodiment, all odd slices with odd slice IDs (e.g., slices 516a, 516c, and so on) can be included in a first slice set owned by node A, and all even slices with even slice IDs (e.g., slices 516b, 516d, and so on) can be included in a second slice set owned by node B.

Thus, each logical address of the logical address space or range 510 can be owned by a single one of the nodes A or B.

In at least one embodiment, the techniques of the present disclosure can provide for an improvement in data cache efficiency and an increase in the data cache hit rate in a multiple node system where each of the multiple nodes of the system can receive I/Os and can service such received I/Os.

In at least one embodiment, an architecture can be utilized which partitions ownership of a logical address space of user data or content among the multiple processing nodes of the storage system. For example, the logical address space can correspond to one or more volumes, or more generally, one or more storage objects. The storage objects can include logical devices or volumes, files, file systems, directories, and/or sub-portions of such storage objects.

In at least one embodiment, a node assigned a particular logical address, or a subrange of logical addresses, can be designated as the sole owner, respectively, of the logical address or subrange. In at least one embodiment, a node which owns the logical address can perform address resolution processing (sometimes referred to herein as simply resolution processing) for the logical address using the mapping information of MD pages and can traverse a portion, or at least some, of the chain of MD pages to obtain an IDP (indirect pointer) to the requested read data.

In at least one embodiment, the logical address space can be partitioned or divided into slices where each slice corresponds to a sub-volume logical address portion. In this manner, a volume or logical device, or more generally a storage object, can have an associated logical address space which is partitioned into multiple slices. Each such slice can be assigned to a single one of the nodes as the slice's owner.

In at least one embodiment, multiple different techniques that can be used in connection with data caching in a system with multiple nodes. In at least one embodiment using one of the techniques, caching of user data stored at a logical address is allowed on both the owning node of the logical address and the non-owning node of the logical address. In such an embodiment using the techniques of the present disclosure, data integrity with respect to cached content on the non-owning and owning nodes can be guaranteed without incurring undesirable processing costs.

The techniques of the present disclosure include three methods M1, M2 and M3 denoting 3 different techniques or methods of data caching which can be considered for use in at least one embodiment. In at least one embodiment, a selected one of the methods M1, M2 and M3 can be applied for a read I/O directed to a logical address LA where the read I/O is received by a non-owner node that does not own LA. In at least one embodiment, when the read I/O directed to LA is received by the non-owner node that does not own LA, the non-owner node can issue a remote procedure call (RPC) to the owner node to perform processing including any needed resolution processing using mapping information of MD pages associated with the LA. The particular processing performed by both the owner node and the non-owner initiator node can vary with the particular one of the methods M1, M2 or M3 that is applied. In at least one embodiment of the method M1, caching of content or data stored at logical addresses can be allowed by an owner node but not allowed by a non-owner node. In at least one embodiment of the method M2, caching of content or data stored at logical addresses can be allowed by both owner and non-owner nodes. In at least one embodiment of the method M2, cache coherency of content cached on both owner and non-owner nodes can be provided using an address hint or more generally a hint corresponding to the physical storage location or address storing content for a particular logical address LA. In at least one embodiment of M2, the hint can be an IDP used to read the content for the LA from the physical storage location on BE non-volatile storage. In at least one embodiment of M2, the hint can be an address of, or pointer to, the physical storage location on BE non-volatile storage that contains the content for the LA. In at least one embodiment of the method M3, caching of content or data stored at logical address can be allowed by the owner node but not allowed by the non-owner node. In at least one embodiment of the method M3 where the read I/O directed to LA is received by the non-owner node, the owner node of LA can perform an additional opportunistic read of the content of LA from the BE non-volatile storage in order to have the content for LA cached locally on the owner node. Such an opportunistic read can be performed by the owner node of LA in anticipation that the owner node may receive a subsequent read I/O directed to LA. In this manner, the owner node would be able to service the subsequent read I/O directed to LA using its local cached copy of content stored at LA (e.g., read cache hit) rather than experiencing a performance penalizing read cache miss on the owner node for the "yet to be received" subsequent read I/O. In this manner, M3 can include the additional cost of the owner node performing such an opportunistic or speculative read when there is no guarantee that the cached content for LA stored on the owner node will be utilized or referenced before being removed or evicted from the owner node's cache.

In at least one embodiment, selection of one of the multiple caching techniques can be performed at development or installation time based on one or more criteria, where the selected caching technique can be applied in a constant or static manner such that the selected technique does not vary or change at runtime during operation of the system. In at least one embodiment, the criteria used to select the caching technique can include one or more of the following: optimization target or goal, size of memory dedicated to data cache, expected I/O patterns and/or expected resource utilization. In at least one embodiment, the multiple caching techniques can include the methods or techniques M1, M2 and M3.

In at least one embodiment, selection from among multiple caching techniques can be performed dynamically at runtime in an adaptive manner such as based, at least in part, on one or more metrics that can change over time in the system. In at least one embodiment, the one or more metrics can include: actual or measured resource utilization and/or cache hit rate. In at least one embodiment, the one or more metrics can be provided as feedback or inputs to processing which can select a particular one of the multiple caching techniques to be utilized. In at least one embodiment, evaluation and selection of a particular caching technique can be performed periodically and/or responsive to defined conditions or occurrences of events in the system. In at least one embodiment, the multiple caching techniques can include the methods or techniques M1, M2 and M3.

In at least one embodiment of M2 as a caching technique which allows caching of content by both owning and non-owning nodes with respect to a logical address, if the node receives a read I/O directed to the logical address not owned by the receiving node, the receiving node can perform processing to service the read I/O. A node receiving an I/O operation such as the read I/O can sometimes be referred to as an initiator node. In at least one embodiment, when an initiator node receives the read I/O directed to the logical address it does not own, the initiator node can send a request, such as an RPC, to the owning peer node to perform address resolution processing for the logical address. The node which owns the logical address can perform address resolution processing using the corresponding mapping information for the logical address. The address resolution processing performed by the owning node can include the owning node using the mapping information of MD pages and traversing a portion or at least some of the chain of MD pages to obtain an IDP to the requested read data. The owning node can return the IDP of the read data to the non-owner initiator node. If the non-owning initiator node (which receives the returned IDP in response to the RPC) also has a cached copy of content stored at the logical address and a corresponding IDP, the initiator node can compare the returned IDP (returned from the owning node) to its local corresponding IDP to determine whether the foregoing two IDPs match. In this manner, the corresponding IDP of the cached content for the logical address can be used by the non-owner initiator node as a hint regarding the validity of the cached content. If the foregoing two IDPs match, the non-owner initiator node can determine that its cached content for the logical address is valid, and can thereby return its local cached content for the logical address in response to the read I/O. If the foregoing two IDPs do not match, the initiator node can determine its local cached content for the logical address is invalid. In this latter case, the non-owner initiator node can: use the returned IDP from the owning node to read the current content stored at the logical address from BE non-volatile storage; store the current content obtained from BE non-volatile storage in the non-owner initiator node's local cache along with the returned IDP; and return the current content in response to the read I/O. In this manner, the returned IDP can become a new or revised hint subsequently used by the non-owner initiator node to determine the validity of the current content for the logical address where the current content is cached in the non-owning initiator node.

In at least one embodiment, the mapping information can include a multi-level tree or hierarchical structure of MD pages. In at least one embodiment, the number of levels in the tree or structure can be three or more. In at least one embodiment, the tree can be a B+ tree data structure where each non-leaf node can include up to N children. Thus N can be a specified maximum allowable number of child nodes and N can be 2 or more.

In at least one embodiment in which the mapping information includes a 3 level tree of MD pages, each slice, which is owned by one of the nodes, can correspond to a logical address space subrange associated with a MD leaf page of the tree. The tree can also include a mid MD page level of mid MD pages and a top MD page level of top MD pages. Each mid MD page can include addresses of, or pointers to, MD leaf pages. Each top MD page can include addresses of, or pointers to, MD mid pages.

In at least one embodiment, the storage system can include two nodes and a logical address space can be partitioned into two sets of slices, where each slice set is owned by only a single one of the nodes. The logical address space can be partitioned into consecutive slices which correspond to consecutive, contiguous sequential logical address subranges of the logical address space. The slices can be assigned a unique integer identifier or ID such as beginning with one (1), where even slices can be included a first slice set owned by node A, and where odd slices can be included in a second slice set owned by node B. Each slice can correspond to a logical address subrange size such as 2 MBs. In at least one embodiment, each MD page of the tree of mapping information can include 512 entries, where each entry is a pointer or address. Each non-leaf MD page entry can be a pointer to, or address of, another MD page. Each leaf MD page entry can be a pointer to, or address of, an entry in a VLB (virtual layer block) page. In such an embodiment where each MD leaf corresponds to a 2 MB logical address space portion, each MD leaf entry can correspond to a 4K page of content or stored user data. Each MD leaf entry can include the address of a VLB entry, where the VLB entry further includes another pointer to or address of non-volatile storage containing the content or user data.

In at least one embodiment, a node which receives an I/O operation can be referred to as the initiator node with respect to that particular I/O operation.

In at least one embodiment, the RPC issued by a non-owner node of a logical address to the owner node of the logical address can be a request to perform processing that can use resources which are not owned by the non-owner node issuer or requester of the RPC. Thus in at least one embodiment, the RPC issued by the non-owning node can be made to the owner node to perform an operation on behalf of the non-owning node. In at least one embodiment, the RPC can be a request to perform resolution processing using the mapping information of MD pages. The mapping information can map the logical address to a corresponding physical location on BE non-volatile storage. In at least one embodiment in response to receiving the RPC request, the owning node can perform processing including mapping the logical address owned by the owning node to a corresponding IDP or other pointer or address used to read the content stored at the logical address.

The foregoing and other aspects of the techniques of the present disclosure are described in more detail in the following paragraphs.

In at least one embodiment for a given logical address LA, the owner node can cache the user data (UD) or content stored at the LA. In at least one embodiment, the owner node can also cache a corresponding IDP for the LA and UD or content stored at the LA. In at least one embodiment, caching of the corresponding IDP on the owner node can be optionally performed in accordance with the techniques of the present disclosure. In at least one embodiment, the cached IDP stored on the owner node can be included in the response to an RPC from the peer non-owner node rather than performing resolution processing of the associated LA to obtain the IDP which is included in the RPC response. Alternatively, if the owner node of LA does not cache the IDP along with the content stored at the LA, the owner node can perform resolution processing using the mapping information for LA to obtain its corresponding IDP which can be included in the RPC response.

In at least one embodiment where the owner node can cache both content and an IDP corresponding to an LA, the owner node's cache may either include both the content and IDP for a corresponding LA, or may otherwise include neither the content nor the IDP for LA. As a variation the owner node can separately and independently maintain a first cache of content stored at logical addresses (where the first cache can be indexed by logical addresses) and second cache of IDPs corresponding to logical addresses (where the second cache can be indexed by logical addresses). In such an embodiment where the first and second caches of an owner node are maintained independently possibly using different caching policies and having different number of entries, it can be possible for a LA of an owner node to have corresponding information cached in only one of the two caches depending on the particular caching policies, sizes and/or other characteristics. In this latter scenario, it is straightforward to one of ordinary skill in the art to further modify or extend the processing and techniques described herein to apply to the latter scenario.

In at least one embodiment using techniques described below where a non-owner node of an LA is allowed to cache content corresponding to the LA, the non-owner node also caches an IDP for the LA, where the IDP can be used to access content for the LA. In at least one such embodiment, if the non-owner node caches content for the LA, the non-owner node also caches the IDP corresponding to the LA and also corresponding to the non-owner node's cached content for LA. Thus in at least one embodiment, the non-owner node of an LA can cache both content and IDP corresponding to the LA. In at least one embodiment, the cached IDP of the non-owner node can be used by the non-owner node to validate its cached copy of content for the LA. In at least one embodiment, the IDP for LA can be a pointer or reference to, or an index or address of, a VLB entry of a VLB. The VLB entry can further include an address of, or a pointer to, a PLB (physical layer or large block) on BE non-volatile storage where the content of the LA is stored. More generally, the IDP can be characterized as, or can denote, a hint used by the non-owner node to validate its cached copy of content for the LA.

In at least one embodiment, the IDP for a logical address can be a pointer or reference to, or an index or address of, a VLB entry as noted above. As a variation rather than use an IDP such as a pointer to, or address of, a VLB entry, an embodiment can more generally use other suitable types of hints where such a hint can be used by a non-owner node to validate its cached content for a logical address, and where such a hint can be used to access or obtain valid current content stored at the logical address. For example, in at least one embodiment, the hint for a logical address can be a pointer to the PLB of BE non-volatile storage storing the current valid content for the logical address.

In examples and discussion below, embodiments can be described where a node is allowed to cache content for logical addresses owned by the node. Thus although following discussion may assume that an owner node of a logical address caches content for the logical address but may or may not cache a corresponding IDP, the owner node of a logical address can also optionally cache an IDP corresponding to the cached content stored at the logical address. It is straightforward to one of ordinary skill in the art to further modify the processing and techniques described herein to apply to the owner node also caching IDPs, or other suitable addresses or pointers used as hints in connection with validating associated cached content for a logical address.

What will now be described is owner node read I/O processing when the owner node receives the read I/O and is thus the initiator with respect to the read I/O in at least one embodiment in accordance with the techniques of the present disclosure. In at least one embodiment, UD or content stored at a LA can be cached on an owner node of the LA when the owner node reads the UD or content stored at the LA from BE non-volatile storage using mapping information of MD pages corresponding to the LA. It should also be noted that in connection with other processing and techniques described below where a read I/O directed to LA is received by a non-owner node that issues an RPC to the owner node, a cache hit can occur if the requested content for LA is cached on the owner node.

In at least one embodiment, when the owner node of LA receives a read for LA whereby the owner node is also the initiator node for LA of the read I/O, the owner node can perform read I/O processing that includes determining whether the content C1 for LA is stored in the data cache of the owner node. If the content C1 for LA is stored in the cache of the owner node thereby resulting in a cache hit, the owner node can return the cached content C1 for LA in response to the read I/O. Alternatively, if the content C1 for LA is not stored in the cache of the owner node thereby resulting in a cache miss, the owner node can: 1) perform resolution processing using the mapping information of the chain of MD pages to obtain the IDP for LA; 2) use the IDP to read content C1 stored at LA from the BE non-volatile storage; 3) cache the content C1 (just read from BE non-volatile storage) and IDP corresponding to LA in its node local cache; and 4) return the content C1 for LA in response to the read I/O.

Thus, in at least one embodiment, when the node that receives the read I/O directed to LA is also the owner, the node can be characterized as both the initiator and the owner with respect to the LA. In at least one embodiment for a node that is both the initiator and the owner with respect to the LA of a read I/O, if the read I/O processing results in a read cache miss with respect to the content of LA not being stored in the initiator node's cache, the node reads the corresponding content from the BE PDs and can cache the content for LA along with the corresponding IDP.

Figure 8:
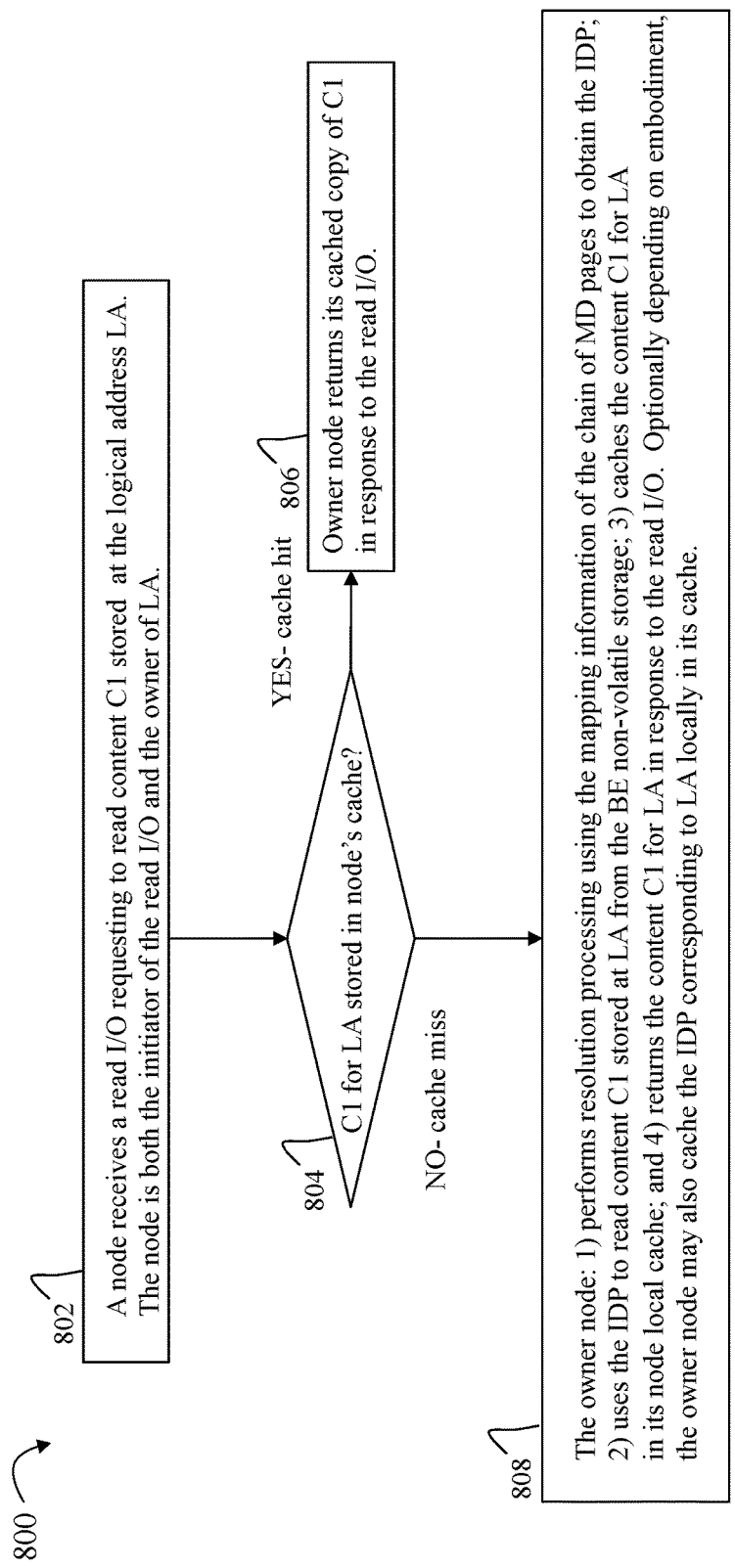
FIGS. 8, 9A, 9B, 10A, 10B, 11 and 12 are flowcharts of processing steps that can be performed in at least one embodiment in accordance with the techniques of the present disclosure.

Referring to FIG. 8, shown is a flowchart 800 summarizing processing that can be performed by an owner node of a logical address LA when the owner node receives a read I/O directed to LA in at least one embodiment in accordance with the techniques of the present disclosure. The flowchart 800 summarizes owner node read I/O processing discussed above in at least one embodiment.

At the step 802, a node receives a read I/O requesting to read content C1 stored at the logical address LA. The node is both the initiator of the read I/O and the owner of LA. From the step 802, control proceeds to the step 804.

At the step 804, a determination can be made as to whether C1 for LA is stored in the initiator owner node's cache. If the step 804 evaluates to yes thereby denoting a cache hit with respect to C1 for LA in the initiator owner node's cache, control proceeds to the step 806. In the step 806, the owner node can return its cached copy of C1 in response to the read I/O.

If the step 804 evaluates to no thereby denoting a cache miss with respect to C1 for LA in the initiator owner node's cache, control proceeds to the step 808. At the step 808, the owner node: 1) performs resolution processing using the mapping information of the chain of MD pages to obtain the IDP corresponding to LA; 2) uses the IDP to read content C1 stored at LA from the BE non-volatile storage; 3) caches the content C1 for LA in its node local cache; and 4) returns the content C1 for LA in response to the read I/O. Optionally depending on embodiment, the owner node may also cache the IDP corresponding to LA locally in its cache.

What will now be described is the first method or technique M1 that can be used in connection with read I/O processing for a read I/O directed to LA, where the read I/O is received by the node which does not own LA. In this manner, the non-owner node of LA is the initiator with respect to the read I/O directed to LA. In M1, the content or UD stored at a corresponding LA can be cached on the owner node of LA and not cached on the non-owner node. Additionally, depending on embodiment, the IDP corresponding to the LA can also be optionally cached on the owner node but not on the non-owner node of LA.

In a first step S1, a read I/O directed to LA can be received by the non-owner node. Following the step S1, a step S2 can be performed where the non-owner initiator node issues an RPC to the owner node of LA to perform processing with respect to the LA. Following the step S2, a step S3 can be performed.

In the step S3, in response to receiving the RPC, the owner node can perform processing that includes determining whether the content C1 for LA is in the owner node's cache thereby indicating a read cache hit. Otherwise if the content C1 for LA is not in the owner node's cache, a read cache miss occurs with respect to the owner node's cache for content stored at LA. If a cache hit occurs, the owner node can include in the RPC response the cached content for LA. If a cache miss occurs, the owner node can include the IDP for LA in the RPC response without including the cached content for C1 in the RPC response. The owner node of LA can perform resolution processing using the mapping information for LA to obtain the IDP for LA and then can include the IDP for LA in the RPC response. Depending on embodiment if the owner node has the IDP for LA stored in its cache, the owner node can return its cached copy of the IDP for LA in the RPC response.

Thus in at least one embodiment, the owner node can send an RPC response to the requesting non-owner node for LA where the response can conditionally include the content C1 stored at LA if such content C1 for LA is cached in the owner node's cache. Otherwise, the RPC response can include the IDP for the LA without including any content C1 stored at LA in the RPC response. Put another way, the owner node can send an RPC response to the requesting non-owner node for LA where the RPC response can conditionally include the content C1 stored at LA if there is a read cache hit with respect to the owner node's cache for content C1 of LA. If there is no read cache hit with respect to the owner node's cache regarding content C1 for LA, the RPC response can at least include the IDP for the LA without including C1 in the RPC response.

As a further variation in at least one embodiment, the RPC response can conditionally return content C1 stored at LA 1) if such content C1 is cached in the owner node's cache; and 2) also if one or more other specified conditions are met. Otherwise, if either or both of the foregoing evaluate to false, the RPC response can include the IDP for LA without cached content C1 for LA. In at least one embodiment, the one or more conditions can be used to determine whether there are sufficient resources available to transfer the content from the owner node to the non-owner node in the RPC response. In at least one embodiment, such one or more other specified conditions can include at least a first condition that the current network load of the system's internal network (e.g., such as used for internode communications) be less than a maximum threshold. Thus, for example, if there is excessive internode traffic between the nodes, the current network load can exceed the maximum threshold thereby resulting in the RPC response including the IDP for the LA but not including the content C1 stored at LA.

As yet a further variation in at least one embodiment, the one or more conditions can include a second condition based, at least in part, on whether the RPC call from the non-owner node of LA includes an indicator or flag requesting that the owner node not include content stored at LA in its RPC response. The one or more conditions can include the second condition alone, or in combination with the above-noted first and/or other conditions. In at least one embodiment, the RPC call or request from the non-owner node can include LA and can include the flag or indicator that is set and thereby can indicate to the receiving owner node not to include the content C1 of LA in its RPC response even if other specified conditions are met. In at least one embodiment, the non-owner node can set the flag or indicator in the RPC request such that the owner node does not return content for LA in order to avoid excessive data transfer between the nodes. In at least one embodiment, the non-owner node can set the flag or indicator not to return content for LA in response to the current network load of the system's internal network such as used for internode communications exceeding a maximum threshold, where such determination can be made by the non-owner node or caller initiating the RPC call (rather than having such determination made by the owner node recipient of the RPC call) Thus, for example, if there is excessive internode traffic between the nodes, the non-owner node issuing or sending the RPC can determine that the current network load exceeds the maximum threshold thereby resulting in the requesting non-owner node sending an RPC request which includes the indicator or flag set to suppress the owner node returning its cached content for LA. In this case with the indicator or flag set in the RPC call, the owner node's response to the RPC can always include the IDP for LA and would not include the content stored at LA independent of whether the owner node has cached the content for LA.

Following the step S3, a step S4 can be performed where the owner node can send the RPC response that is subsequently received by the non-owner initiator node. Following the step S4, a step S5 can be performed.

In the step S5, in response to non-owner initiator node receiving the RPC response from the owner node, the non-owner initiator node can perform processing. In the step S5, if the RPC response includes the content C1 for LA, the initiator node can return the content C1 in response to the read I/O. Otherwise in the step S5 if the RPC response does not include C1, the RPC response can include the IDP for LA. In this case, the initiator node can use the IDP for LA as included in the RPC response. In particular, the initiator node can use the IDP of the RPC response to read the content C1 stored at LA from BE non-volatile storage, and then return the retrieved content C1 stored at LA in response to the read I/O.

In this first method M1, the initiator non-owner node does not cache the content C1 corresponding to LA and also does not cache the IDP corresponding to LA, where LA is the target logical address of the read I/O received by the initiator non-owner node.

With the foregoing first method M1, one drawback of not caching content C1 or an IDP of a corresponding LA on a node which is not the owner of the LA is that subsequent read I/Os received by the non-owner node (where such subsequent read I/Os are directed to the same LA) result in a read cache miss on the non-owner initiator node. If such subsequent read I/Os directed to the LA are received by the non-owning node within an expected amount of time that such cached content of LA would be expected to remain in the non-owning node's cache, then such read I/Os would have resulted in cache hits with respect to the non-owner initiator node's cache rather than cache misses if the non-owning node cached content for LA. In at least one embodiment, the probability of such a non-owner node read scenario can be expected to be about 25% of all consecutive sequential reads to the same logical address.

Figure 9A:
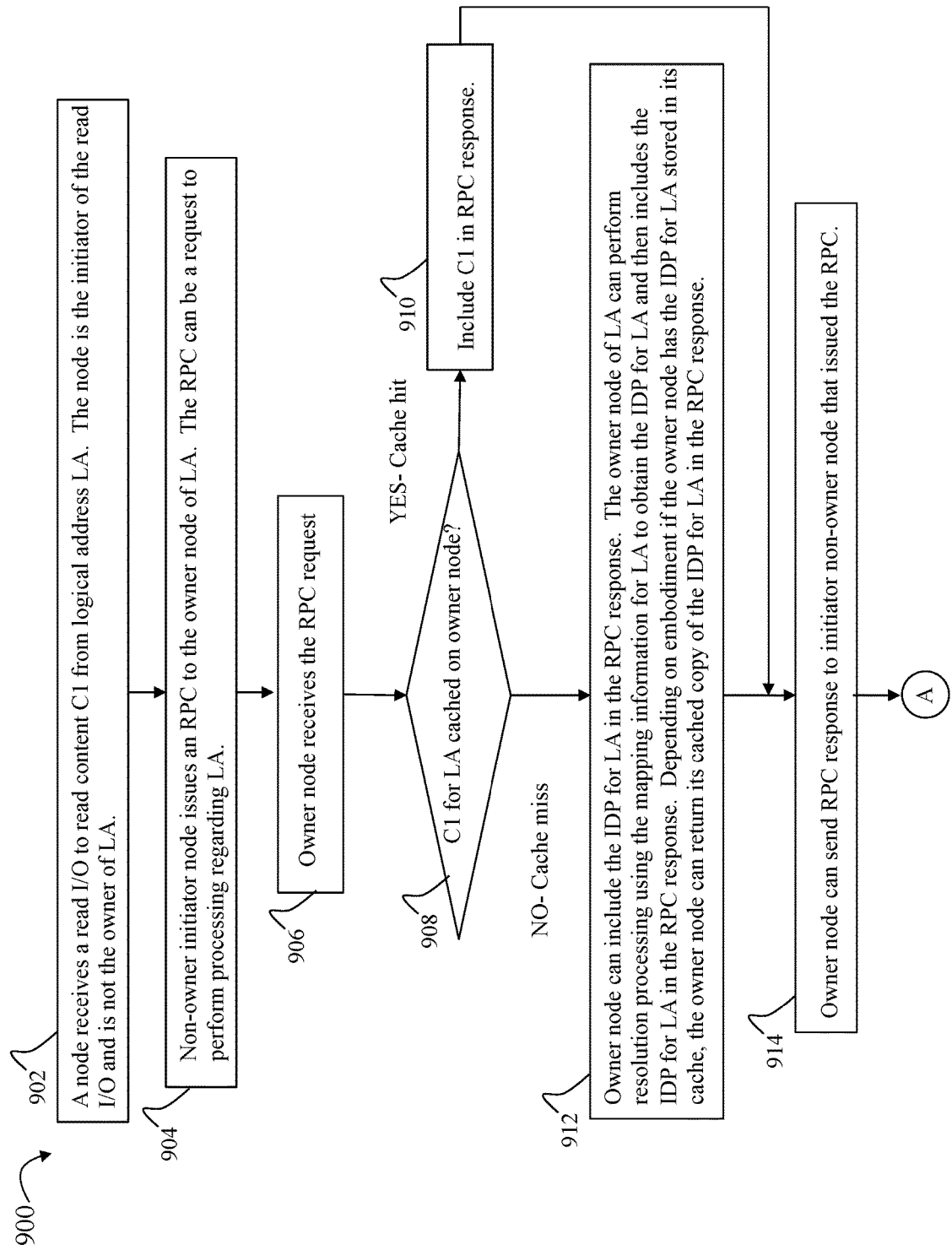
Figure 9B:
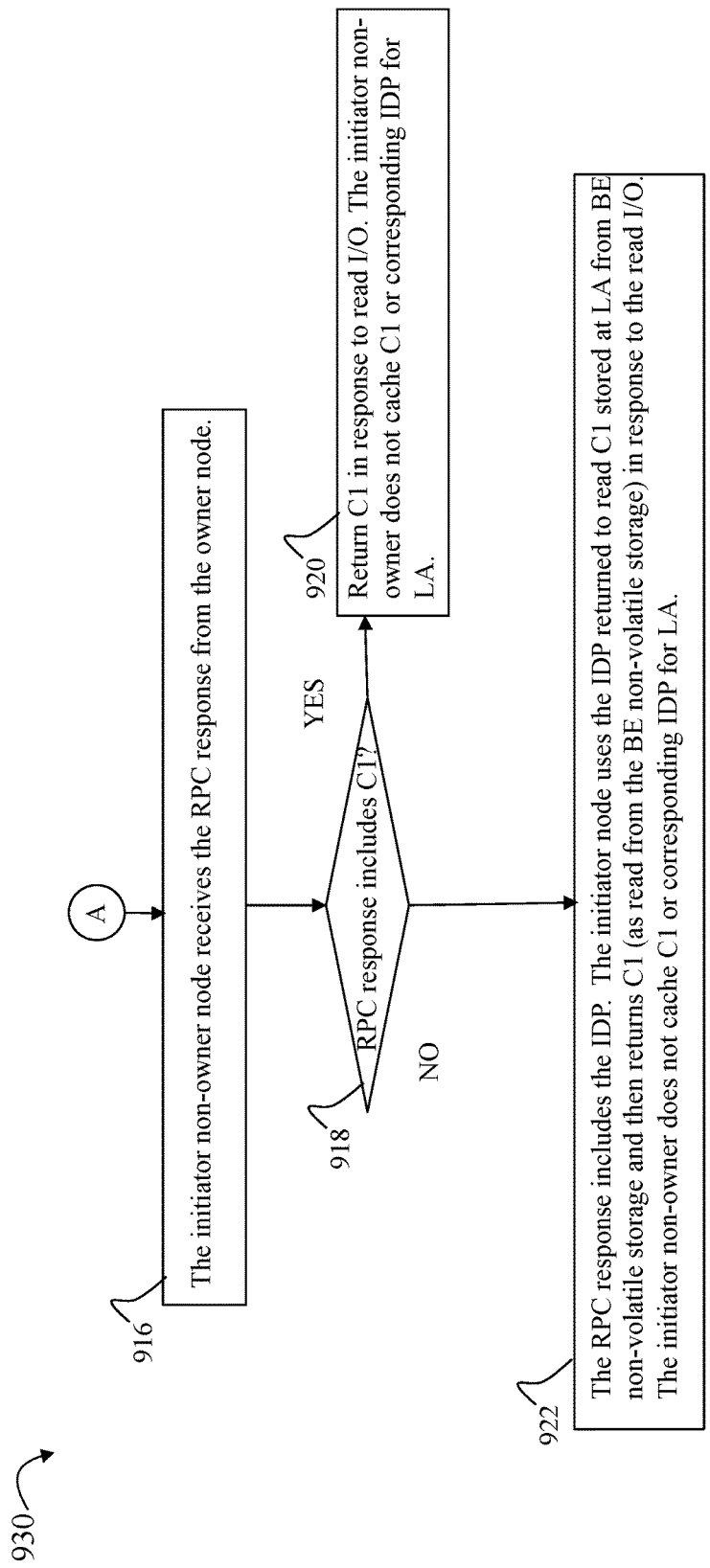

Referring to FIGS. 9A and 9B, shown is a flowchart 900, 930 summarizing processing described above in connection with method M1 in at least one embodiment in accordance with the techniques of the present disclosure.

At the step 902, a node receives a read I/O to read content C1 from logical address LA. The node is the initiator of the read I/O and is not the owner of LA. From the step 902, control proceeds to the step 904.

At the step 904, the non-owner initiator node can issue an RPC to the owner node of LA. The RPC can be a request to perform processing regarding LA. Following the step 904, the owner node of LA receives the RPC request in the step 906. Following the step 906 is a step 908.

At the step 908, a determination can be made on the owner node as to whether C1 for LA is cached on the owner node. If the step 908 evaluates to yes thereby indicating a cache hit with respect to the owner node's local cache, control proceeds to the step 910 where C1 can be included in the RPC response. From the step 910, control proceeds to the step 914.

If the step 908 evaluates to no thereby indicating a cache miss with respect to the owner node's local cache, control proceeds to the step 912. At the step 912, the owner node can include the IDP for LA in the RPC response. In the step 912, The owner node of LA can perform resolution processing using the mapping information for LA to obtain the IDP for LA and then includes the IDP for LA in the RPC response. Depending on embodiment if the owner node has the IDP for LA stored in its cache, the owner node can return its cached copy of the IDP for LA in the RPC response. From the step 912, control proceeds to the step 914.

At the step 914, the owner node can send the RPC response to the non-owner initiator node that issued the RPC. From the step 914, control proceeds to the step 916.

At the step 916, the non-owner initiator node receives the RPC response from the owner node. From the step 916, control proceeds to the step 918.

At the step 918, a determination can be made by the initiator node whether the RPC response includes content C1 stored at LA. If the step 918 evaluates to yes, control proceeds to the step 920. At the step 920, the initiator node can perform processing to return C1 (as included in the RPC response) in response to the read I/O. If the step 918 evaluates to no, control proceeds to the step 922.

At the step 922, the RPC response includes the IDP but not content C1 corresponding to LA. In the step 922, the initiator node uses the IDP returned in the RPC response to read C1 stored at LA from BE non-volatile storage and then returns C1 (as read from the BE non-volatile storage) in response to the read I/O. The initiator non-owner does not cache C1 or a corresponding IDP for LA in its node local cache.

What will now be described is the second method or technique M2 that can be used in connection with read I/O processing for read I/O directed to LA where the read I/O is received by the node which does not own LA. In this manner, the non-owner node of LA is the initiator with respect to the read I/O directed to LA. In M2, the content or UD C1 stored at a corresponding LA can be cached on the owner node of LA and also cached on the non-owner node. Additionally, the IDP corresponding to LA and its content C1 can be cached on the non-owner node as an address hint regarding the particular BE non-volatile storage location from which C1 was read. Additionally, depending on embodiment, the IDP corresponding to the LA can also be optionally cached on the owner node.

In at least one embodiment in order to maintain cache coherency between the owner node and the non-owner node for a particular LA, the non-owner node can cache and utilize both the content C1 and the IDP corresponding to LA.

In a first step S11, a read I/O directed to LA can be received by a non-owner node that does not own LA. Following the step S11 is a step S12 where the non-owner initiator node issues an RPC to the owner node of LA. Following the step S12, a step S13 can be performed.

In the step S13 in response to receiving the RPC, the owner node can perform processing that includes determining whether the content C1 for LA is in owner node's cache thereby indicating a read cache hit. Otherwise if C1 for LA is not in the owner node's cache, a read cache miss occurs with respect to the owner node's cache for content stored at LA. As part of step S13, if a cache hit is determined with respect to the content C1 of LA being stored in the owner node's cache, owner node can include in the RPC response the cached content C1 for LA and can also include the IDP for LA in the RPC response. In at least one embodiment, the owner node can locally cache the IDP for LA along with the content C1 corresponding to LA whereby the owner node's cached IDP can be included in the RPC response. If the owner node does not cache the IDP corresponding to the LA, the owner node can perform resolution processing for LA using corresponding mapping information of MD pages to obtain the IDP for LA where such IDP (as determined by resolution processing using mapping information for LA) can be included in the RPC response.

As part of step S13 if a cache miss is determined with respect to the content C1 of LA being stored in the owner node's cache, the owner node can include the IDP for LA in the RPC response. The owner node of LA can perform resolution processing using the mapping information for LA to obtain the IDP for LA and then can include the IDP for LA in the RPC response. Depending on embodiment if the owner node has the IDP for LA stored in its cache, the owner node can return its cached copy of the IDP for LA in the RPC response. In at least one embodiment, no content for LA is included in the RPC response if a cache miss is determined on the owner node with respect to the cached content for LA.

Thus in at least one embodiment, the owner node can send an RPC response to the requesting non-owner node for LA where the response can include the IDP for LA and can also conditionally include content C1 stored at LA if such content C1 for LA is cached in the owner node's cache. Put another way, the owner node can send an RPC response to the requesting non-owner node for LA where the response can conditionally include the content C1 stored at LA if there is a read cache hit with respect to the owner node's cache for content of LA. If there is no read cache hit with respect to the owner node's cache regarding content for LA, the RPC response can include the IDP for the LA without content for LA.

As a further variation in at least one embodiment, the RPC response can conditionally return content stored at LA 1) if such content is cached in the owner node's cache; and 2) also if one or more other specified conditions are met. Otherwise, if either or both of the foregoing evaluate to false, the RPC response can include the IDP for LA. In at least one embodiment, the one or more conditions can be used to determine whether there are sufficient resources available to transfer the content from the owner node to the non-owner node in the RPC response. In at least one embodiment, such one or more other specified conditions can include at least a first condition that the current network load of the system's internal network (e.g., such as used for internode communications) be less than a maximum threshold. Thus, for example, if there is excessive internode traffic between the nodes, the current network load can exceed the maximum threshold thereby resulting in the RPC response including the IDP for the LA but not including the content stored at LA.

As yet a further variation in at least one embodiment, the one or more conditions can include a second condition based, at least in part, on whether the RPC call from the non-owner node of LA includes an indicator or flag requesting that the owner node not include content stored at LA in its RPC response. The one or more conditions can include the second condition alone, or in combination with the above-noted first and/or other conditions. In at least one embodiment, the RPC call or request from the non-owner node can include LA and can include the flag or indicator that is set and thereby can indicate to the receiving owner node not to include the content of LA in its RPC response even if other specified conditions are met.

In at least one embodiment, the non-owner node can set the flag or indicator in the RPC request such that the owner node does not return content for LA in order to avoid excessive data transfer between the nodes. In at least one embodiment, the non-owner node can set the flag or indicator not to return content for LA in response to the current network load of the system's internal network such as used for internode communications exceeding a maximum threshold, where such determination can be made by the non-owner node or caller initiating the RPC call (rather than having such determination made by the owner node recipient of the RPC call) Thus, for example, if there is excessive internode traffic between the nodes, the non-owner node issuing or sending the RPC can determine that the current network load exceeds the maximum threshold thereby resulting in the requesting non-owner node sending an RPC request which includes the indicator or flag set to suppress the owner node returning its cached content for LA. In this case with the indicator or flag set in the RPC call, the owner node's response to the RPC can always include the IDP for LA and would not include the content stored at LA independent of whether the owner node has cached the content for LA.

In at least one embodiment, the non-owner initiator node can have cached copies of content and an IDP for a LA and the non-owner initiator node can set the flag or indicator in the RPC request such that the owner node does not return content for LA even when the owner node has cached content corresponding to LA. However, in this case, the non-owner initiator node does not know if its cached copies of content and IDP corresponding to LA are current or valid. In at least one embodiment, if the non-owner initiator node includes such cached copies of content and an IDP corresponding to the LA of the read I/O, the flag or indicator of the RPC can be set to suppress the owner node from returning in the RPC response any content for LA. In at least one embodiment in such a case, the flag or indicator of the RPC call or request can be the cached IDP of the non-owner node. In this case, the RPC request including the cached IDP of the initiator node suppresses the owner node from including cached content, if any, of the owner node in the RPC response whereby the RPC response rather includes a returned IDP without any cached content corresponding to LA.

Following the step S13, a step S14 can be performed. In the step S14, the owner node can send the RPC response which is subsequently received by the non-owner initiator node. The RPC response includes at least the IDP for the LA. Additionally, depending on the cache of the owner node and optionally depending on one or more conditions as noted above, the RPC response may also include content C1 for LA.

Following the step S14, a step S15 can be performed. In response to the non-owner initiator node receiving the RPC response from the owner node, the non-owner initiator node can perform processing in the step S15 including determining whether the RPC response includes content C1 for LA along with an IDP, or whether the RPC response includes the ID for LA without including any content C1 for LA. If the RPC response includes content C1 for LA, the initiator node can: 1) return the content C1 for LA in response to the read I/O; and 2) cache the returned content C1 and returned IDP corresponding to LA, where such content and IDP are included in the RPC response returned from the owner node.

As discussed above in at least one embodiment, if the non-owner initiator node had a cached IDP and cached content for LA prior to issuing the RPC to the owner node of LA, the initiator node sets the flag or indicator in the RPC so that the owner node does not include any content for LA in the RPC response. As also discussed above in at least one embodiment, the flag or indicator of the RPC can be the cached IDP for LA as cached locally on the non-owner initiator node. Thus, the RPC response includes a returned IDP for LA but no returned content for LA. In this case, the step S15 as performed by the initiator node can include the initiator node comparing its cached IDP for LA to the returned IDP of RPC response. If the two IDPs match (successful validation of initiator node's cached IDP and content corresponding to LA), the initiator node can return its cached content for LA in response to read I/O. Otherwise, two IDPs do not match thereby denoting unsuccessful validation or invalidation of the initiator node's cached IDP and content corresponding to LA. In this case where the two IDPs do not match, the initiator node can a) use the returned IDP of RPC response to read content C1 for LA from BE non-volatile storage; b) return the content C1 for LA as read from BE non-volatile storage in response to the read I/O; and c) cache the returned IDP and content C1 read from BE PDs for LA in the non-owner initiator node's cache.

The above method M2 allows maintaining consistent caches of content on both the owner node and the non-owner node with respect to a particular logical address to avoid the read cache miss penalty noted above in scenarios where subsequent read I/Os to the same LA are received by the non-owner initiator node within the period of time that the cached content of LA is expected to remain in cache of the non-owner initiator node. The above method M2 provides for maintaining cache consistency among both owner and non-owner nodes without additional processing costs.

It should be noted that, with respect to a read I/O or request to read content for LA, both a non-owner initiator node and an owner non-initiator node can cache valid content corresponding to the LA. Thus, there can be a cache hit for LA on both the non-owner initiator node and the owner non-initiator node. A first cache hit for content of LA on a non-owner initiator node can generally be more cost efficient in terms of processing than performing an RPC call and having a second cache hit for content of LA on the owner non-initiator node since the first cache hit on the initiator node can avoid transferring the content for LA from the owner node's cache to the initiator node.

Figure 10A:
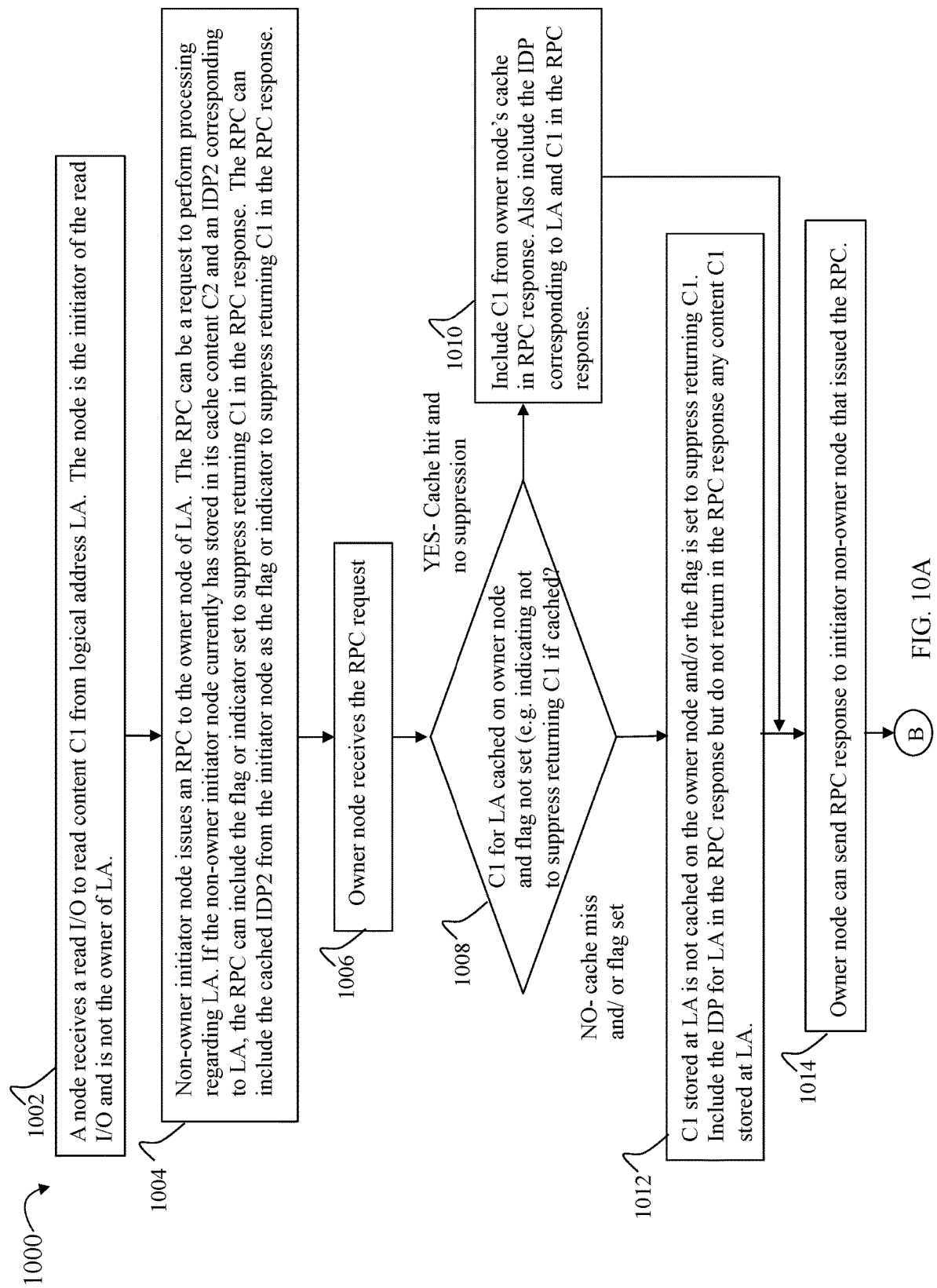
Figure 10B:
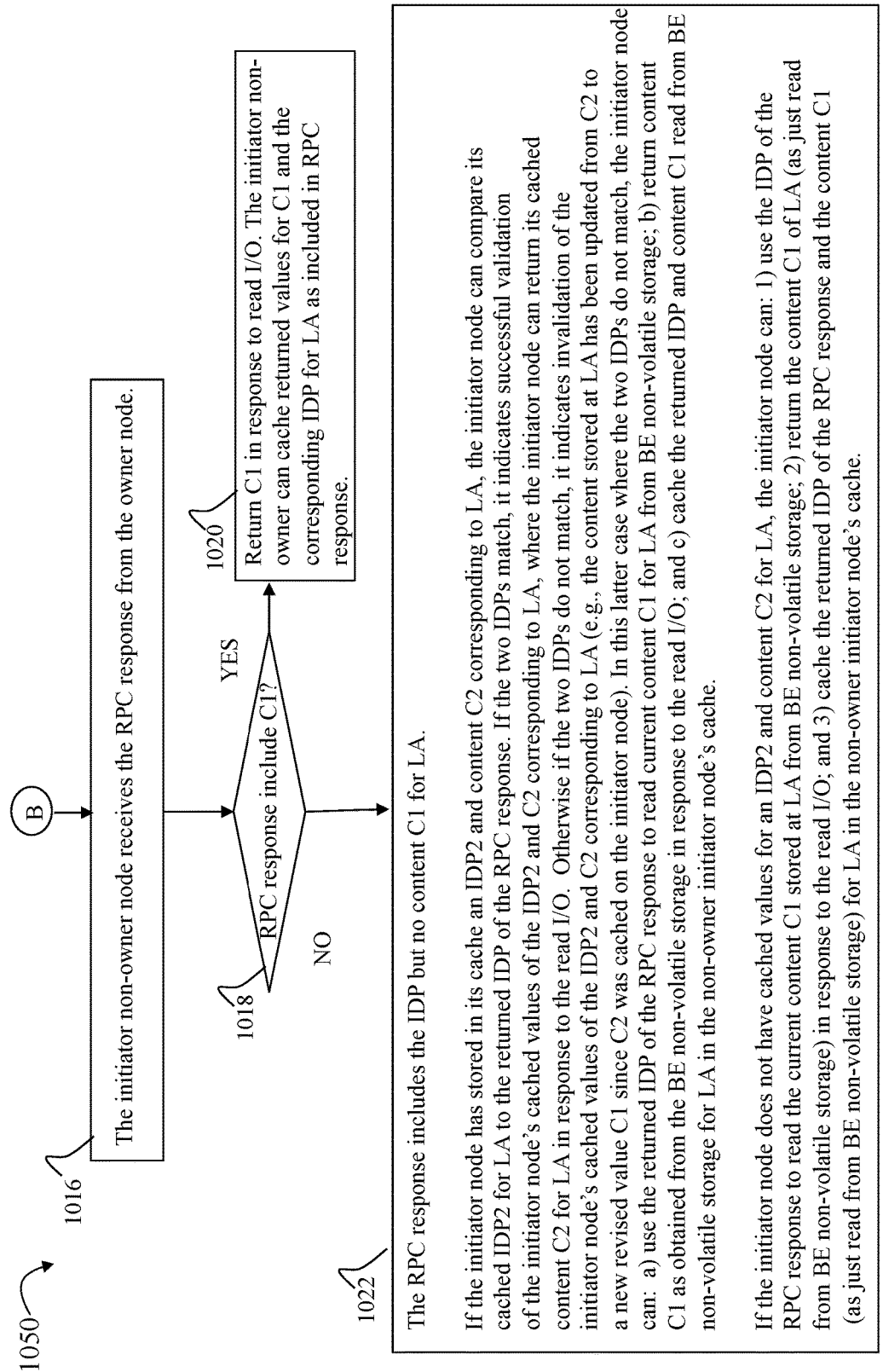

Referring to FIGS. 10A and 10B, shown is a flowchart 1000, 1050 summarizing processing described above in connection with method M2 in at least one embodiment in accordance with the techniques of the present disclosure.

At the step 1002, a node receives a read I/O to read content C1 from logical address LA. The node is the initiator of the read I/O and not the owner of the LA. From the step 1002, control proceeds to the step 1004.

At the step 1004, the non-owner initiator node issues an RPC to the owner node of LA. The RPC can be a request to perform processing regarding LA. If the non-owner initiator node currently has stored in its cache content C2 and an IDP2 both corresponding to LA, the RPC can include the flag or indicator set to suppress returning C1 in the RPC response. The RPC can include the cached IDP2 from the initiator node as the flag or indicator to suppress returning C1 in the RPC response. From the step 1004, control proceeds to the step 1006 where the owner node receives the RPC request From the step 1006, control proceeds to the step 1008.

At the step 1008, a determination can be made on the owner node as to whether current content C1 for LA is cached on the owner node and whether the flag of the RPC is not set. Consistent with discussion herein, if the flag of the RPC is not set, it indicates that the owner node should not suppress returning C1 if cached on the owner node. If the step 1008 evaluates to yes thereby indicating that the flag of the RPC is not set (e.g., no suppression of returning content C1 if cached) and thereby indicating a cache hit on the owner node with respect to content C1 for LA, control proceeds to the step 1010. At the step 1010, processing can include the cached content C1 stored at LA from the owner node's cache in the RPC response. Also the step 1010 can include the IDP corresponding to LA and C1 in the RPC response. From the step 1010, control proceeds to the step 1014.

If the step 1008 evaluates to no, control proceeds to the step 1012. The step 1008 evaluating to no means that C1 stored at LA is not cached on the owner node and/or the flag of the RPC is set to suppress returning C1 in the RPC response. In this case, the step 1008 can include the IDP for LA in the RPC response but not returning any content C1 stored at LA in the RPC response. From the step 1012, control proceeds to the step 1014.

At the step 1014, the owner node can send the RPC response to the initiator non-owner node that issued the RPC (in the step 1004). From the step 1014, control proceeds to the step 1016 where the initiator non-owner node receives the RPC response from the owner node. Following the step 1016 is a step 1018.

At the step 1018, a determination is made by the non-owner initiator as to whether the RPC response includes content C1 stored at LA. If the step 1018 evaluates to yes, it means that the RPC response includes both the content C1 stored at LA along with the IDP corresponding to C1 and LA. If the step 1018 evaluates to yes, control proceeds to the step 1020. At the step 1020, processing can be performed by the non-owner initiator node to return C1 in response to the read I/O. Additionally in the step 1020, the non-owner initiator can cache the returned values for C1 and the corresponding IDP for LA as included in the RPC response.

If the step 1018 evaluates to no, control proceeds to the step 1022. As a result of the step 1018 evaluating to no, the RPC response include the IDP for LA but the RPC response does not include any content for LA. In the step 1022, if the initiator node has stored in its cache an IDP2 and content C2 corresponding to LA, the initiator node can compare its cached IDP2 for LA to the returned IDP of the RPC response. If the two IDPs match, it indicates successful validation of the initiator node's cached values of the IDP2 and C2 corresponding to LA, where the initiator node can return its cached content C2 for LA in response to the read I/O. Otherwise if the two IDPs do not match, it indicates invalidation of the initiator node's cached values of the IDP2 and C2 corresponding to LA (e.g., the content stored at LA has been updated from C2 to a new revised value C1 since C2 was cached on the initiator node). In this latter case where the two IDPs do not match, the initiator node can: a) use the returned IDP of the RPC response to read current content C1 for LA from BE non-volatile storage; b) return content C1 as obtained from the BE non-volatile storage in response to the read I/O; and c) cache the returned IDP and content C1 read from BE non-volatile storage for LA in the non-owner initiator node's cache.

In the step 1022, if the initiator node does not have cached values for an IDP2 and content C2 for LA, the initiator node can: 1) use the IDP of the RPC response to read the current content C1 stored at LA from BE non-volatile storage; 2) return the content C1 of LA (as just read from BE non-volatile storage) in response to the read I/O; and 3) cache the returned IDP of the RPC response and the content C1 (as just read from BE non-volatile storage) for LA in the non-owner initiator node's cache.

What will now be described is the third method or technique M3 that can be used in connection with read I/O processing for read I/O directed to LA where the read I/O is received by the node which does not own LA. In this manner, the non-owner node of LA is the initiator with respect to the read I/O directed to LA. In M3, the content or UD C1 stored at a corresponding LA can be cached on the owner node of LA and is not cached on the non-owner node. Additionally, depending on embodiment, the IDP corresponding to the LA can also be optionally cached on the owner node of LA.

In a first step S31 of method M3, the initiator node receives a read I/O directed to LA where LA is not owned by the initiator node and is rather owned by a peer node. Following the step S31 is a step S32 where the initiator node sends an RPC request for LA to the owner node. Following the step S32 is a step S33.

In the step S33, the owner node of LA receives the RPC and performs processing. In the step S33, the owner node obtains the IDP for LA. The IDP can be obtained by performing resolution processing using mapping information of MD pages for LA. In embodiments where the owner node also caches IDPs of owned logical addresses and the IDP for LA is currently cached, the cached IDP for LA can alternatively be obtained. In the step S33, the owner node returns the IDP for LA in the RPC response to non-owner initiator node. Additionally, if content for LA is not currently stored in owner node's cache, in the step S33: the owner node uses IDP for LA to read content C1 for LA from BE non-volatile storage and thus performs an extra opportunistic or speculative read; and then the owner node stores the content C1 for LA in the owner node's cache.

Following the step S33 is a step S34 where the initiator node receives the RPC response from the owner node of LA. The RPC response includes the IDP for LA and the initiator node can 1) use the returned IDP for LA to read the content for LA from the BE non-volatile storage and then 2) returns the content for LA in response to the read I/O.

The method M3, in contrast to the prior two methods M1 and M2, involves the additional cost of an extra opportunistic data or content read on the owner node. Moreover, this content C1 for LA is read without any guarantee that it will be ever used before being removed from the owner node's cache.

In at least one embodiment, the method M3 can be applied or used in cases where the system has free or available backend (e.g., BE components that read from BE non-volatile storage) and CPU resources. From the other side in at least one embodiment, this method M3 allows for maintaining cache separate cache domains where only the owner node of a LA caches content stored at the LA. Using method M3 in at least one embodiment, there is no duplication of cached content for the same LA between the nodes such that cache memory resources are used efficiently.

In at least one embodiment as a variation to the above, the RPC response from the owner node can return the content for the LA rather than the IDP corresponding to the LA. In at least one embodiment, the content for LA can be conditionally returned in the RPC response rather than the IDP for LA based on the evaluation of one or more conditions such as, for example, the condition that the current network load of the system's internal network (e.g., such as used for internode communications) be less than a maximum threshold as discussed above in connection with methods M1 and M2. In at least one embodiment where the RPC response from the owner node returns the content for the LA rather than the corresponding IDP for the LA, the owner node can return the content for LA from the owner node's local cache if such content for LA is cached on the owner node. Otherwise if the content for LA is not cached in the owner node's cache, the owner node can: perform resolution processing to obtain the IDP for LA; use the IDP to perform the opportunistic read of the content from BE non-volatile storage as discussed above; return the content for LA read from the BE non-volatile storage; and then store the content for LA in the owner node's local cache.

Figure 11:
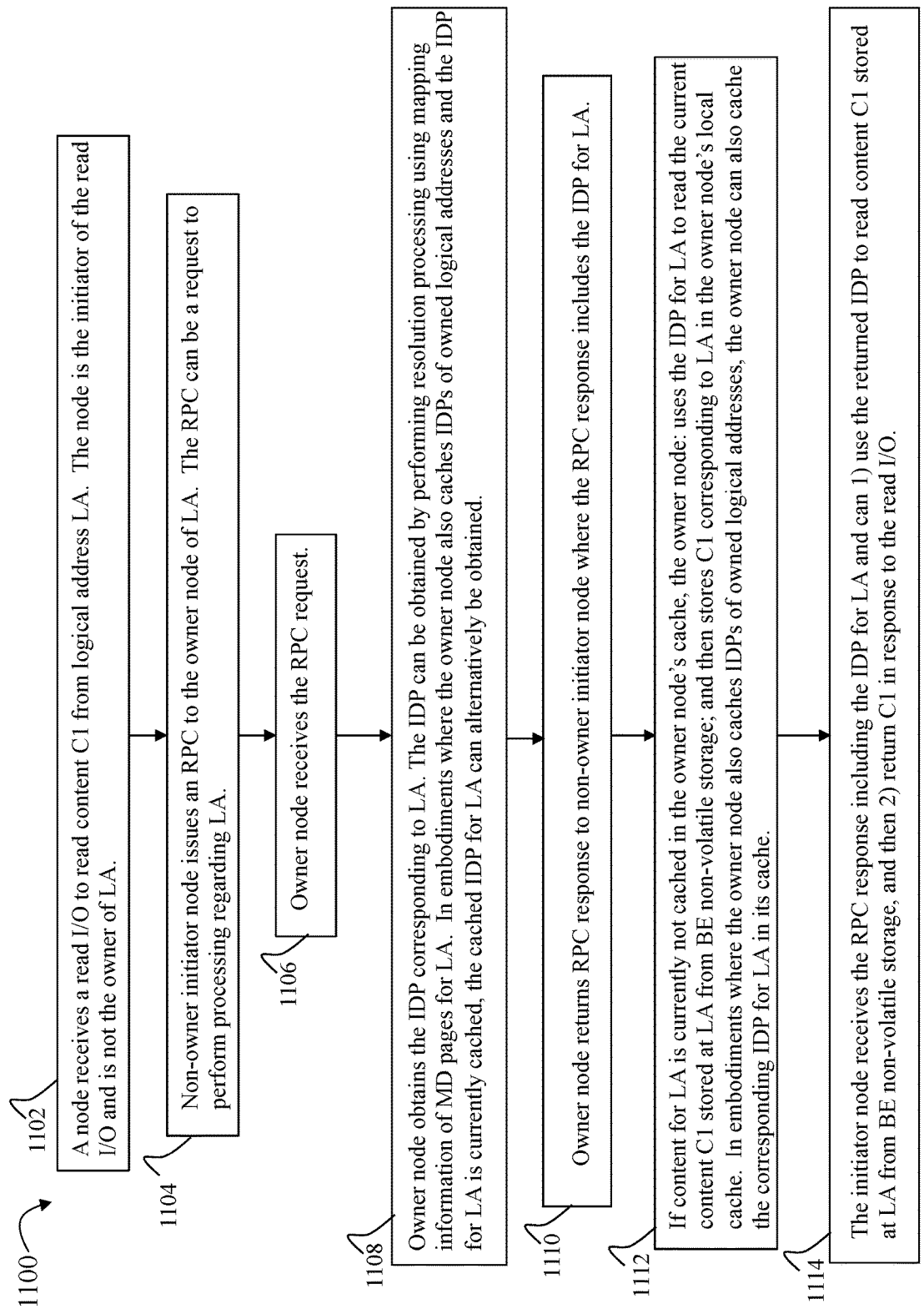

Referring to FIG. 11, shown is a flowchart 1100 summarizing processing described above in connection with method M3 in at least one embodiment in accordance with the techniques of the present disclosure.

At a step 1102, a node receives a read I/O to read content C1 from the logical address LA. The node is the initiator of the read I/O and is not the owner of LA. From the step 1102, control proceeds to the step 1104.

At the step 1104, the non-owner initiator node issues an RPC to the owner node of LA. The RPC can be a request to perform processing regarding LA. From the step 1104, control proceeds to the step 1106 where the owner node receives the RPC request. From the step 1106, control proceeds to the step 1108.

At the step 1108, the owner node obtains the IDP corresponding to LA. The IDP can be obtained by performing resolution processing using mapping information of MD pages for LA. In embodiments where the owner node also caches IDPs of owned logical addresses and the IDP for LA is currently cached, the cached IDP for LA can alternatively be obtained. From the step 1108, control proceeds to the step 1110.

At the step 1110, the owner node returns an RPC response to the non-owner initiator node where the RPC response includes the IDP for LA. From the step 1110, control proceeds to the step 1112.

At the step 1112, if content C1 for LA is currently not cached in the owner node's cache, the owner node: uses the IDP for LA to read the current content C1 stored at LA from BE non-volatile storage; and then stores C1 corresponding to LA in the owner node's local cache. In embodiments where the owner node also caches IDPs of owned logical addresses, the owner node can also cache the corresponding IDP for LA in its cache. From the step 1112, control proceeds to the step 1114.

At the step 1114, the initiator node receives the RPC response including the IDP for LA and can 1) use the returned IDP to read content C1 stored at LA from BE non-volatile storage, and then 2) return C1 in response to the read I/O.

What will now be described are various considerations that can be taken into account when selecting one of the caching methods or techniques M1, M2 or M3 in at least one embodiment in accordance with the techniques of the present disclosure.

In at least one embodiment, the method M1 can be an initial or starting policy applied in an adaptive or dynamic approach in which the system can switch between applying different ones of the methods described herein at various points in time.

In at least one embodiment, the method M2 can be expected to be optimal in terms of providing an expected maximum cache hit ratio of all methods M1, M2 and M3 described herein, without any extra processing cost. However, this method M2 can also generally be memory wasteful, since the same content or data may be generally cached on both nodes (e.g., cache duplication). Thus in at least one embodiment, the method M2 can be selected and applied when the system has sufficient cache to accommodate an expected data set on both nodes in a dual node system. The method M3 can generally be expected to provide about the same cache hit ratio as method M2, while also using only about half the amount of memory dedicated for caching. However, applying method M3 involves an additional cost, associated with maintaining both node caches due to the additional BE read which is performed by the owner node. In at least one embodiment therefore the method M3 can be dynamically selected and applied when the system has sufficient free CPU and BE resources. The method M3 can also be selected for use due to the smaller amount of cache generally consumed. In at least one embodiment, the method M3 may not be applied as the single static constant approach applied in a system since proper determination of whether to use M3 or another method (such as M1 or M2) can depend, at least in part, on the system's workload load and I/O pattern. In at least one embodiment, the method M3 may be applied in a system with dynamic or adaptive cache policy switching In at least one embodiment, a system can be configured to use one of the three methods M1, M2 or M3 described herein in a static or constant manner where the selected method does not vary dynamically at runtime with changing conditions in the system. The particular one of the methods selected can be based, at least in part, on the amount of cache memory available for caching content or data on both nodes. For example, in at least one embodiment, the system can be configured to statically use method M1 or M2 based, at least in part, on the amount of cache memory dedicated for storing content or user data on both nodes. Method M1 only caches content or data of logical addresses on an owner node and does not allow caching of content or data on a non-owner node. In contrast, the method M2 allows caching of content or data on both owner and non-owner nodes. Thus method M2 can be expected to result in a higher cache hit ratio than method M1. However with method M2 there can be caching inefficiency where M2 can be characterized as more memory wasteful in comparison to method M2 since in method M2, the same content or data can be cached on both nodes (e.g., cache duplication). In at least one embodiment, the method M1 can be selected for use statically in a configuration of a system where the amount of cache memory on each of the nodes is less than a specified threshold since the system performance may be adversely affected by the caching inefficiencies of the method M2. In at least one embodiment, the method M2 can be selected for use statically in a configuration of a system where the amount of cache memory on each of the nodes is above a specified minimum threshold since the nodes can have available cache resources to accommodate expected I/O workload and other typical uses along with additional cache resources consumed by the duplicative caching inefficiencies of the method M2. If the system configuration changes such that the amount of cache of the nodes increases, an embodiment can consider modifying the selected method utilized. Generally in at least one embodiment, an amount of cache E1 needed for a particular expected workload W1 in a system can be estimated. Based on such an estimate of E1 needed for W1 by one node, an embodiment can determine whether each node has the amount of cache E1. In at least one embodiment, if each node has at least E1 amount of cache available for use as a data cache, the system can be configured to use method M2, and otherwise, the method M1 can be configured for use. In at least one embodiment, the method M1 can be the default method utilized in a system. In at least one embodiment, the method M3 may not be selected or applied in a static or constant approach but rather method M1 or M2 can be selected.

In at least one embodiment, a dynamic or adaptive evaluation can be performed at various points in time, such as periodically and/or in response to one or more specified conditions occurring, to select one of the three methods M1, M2 and M3 to be utilized and applied. In at least one embodiment, the dynamic evaluation can be based, at least in part, on one or more dynamic evaluation criteria that can change during runtime of the system. Thus, as conditions specified in the dynamic evaluation criteria can change over time, so can the particular selected method that is utilized and applied. In at least one embodiment, the system can be initially configured at boot up or startup to use method M1. Periodically, the one or more dynamic evaluation criteria can be evaluated to determine whether current conditions in the system trigger a switch or change in the selected method applied in the system. In at least one embodiment, the dynamic evaluation criteria can include one or more metrics regarding consumption of cache used for storing content. For example, the dynamic evaluation criteria can include an average cache utilization denoting a percentage of the total amount or size of the data cache that is allocated or consumed for storing user data or content. If, for example, the cache utilization is below a threshold and the system is currently applying method M2 (e.g., thereby indicating that the data cache resource is being underutilized for caching content or data), the system can be configured to switch from M2 and alternatively apply another method such as M1 or M3.

In at least one embodiment, the dynamic evaluation criteria can be based, at least in part, on cache size in combination with a cache hit ratio such as with respect to read I/Os. If cache size increases between successive time periods but the cache hit ratio between the successive time periods does not accordingly increase (e.g., cache hit ratio decreases, remains approximately the same, or does not increase by at least a minimum amount), it can be determined that the additional cache has not accordingly resulted in expected gains in cache hits. The dynamic evaluation criteria can include a condition indicating the foregoing that a particular increase in cache size is expected to also be associated with a corresponding specified increase in read cache hit ratio. In at least one embodiment, the total cache size used for the data cache can increase as an aggregate amount based on the collective sizes of the caches on both nodes. In at least one embodiment, the cache size can increase between two successive periods such as by switching from applying method M1 or M3 in a first time period to applying M2 in a second time period. The data cache size can increase using M2 as compared to M1 or M3 since M2 allows caching of data or content on both owner and non-owner nodes and since M1 and M3 allow caching of data or content on an owner node but not on a non-owner node. If the system is currently applying method M2 and the foregoing condition evaluates to false, for example, where the amount of cache between two successive periods increases and the cache hit ratio does not increase by at least a specified amount, the system can be configured to dynamically transition from applying method M2 to applying an alternate method of M1 or M3.

In at least one embodiment, the dynamic evaluation criteria can be based, at least in part, on one or more cache-related metrics such as cache size, one or more metrics regarding BE resource consumption and/or one or more metrics regarding CPU resource consumption. For example in at least one embodiment, the dynamic evaluation criteria can be based, at least in part, on one or more cache-related metrics such as cache utilization, cache size (e.g., total amount or size of memory dedicated for caching across nodes for the particular method or caching technique applied), average retention time (e.g., average amount of time a page remains in cache), and/or average number of hits per page during page retention time; one or more BE resource consumption metrics such as BE disk utilization, BE controller utilization, and/or BE I/O workload; and/or CPU utilization regarding main CPUs or SPs. If for example the system is currently applying method M2 and the cache utilization is below a threshold and the system has at least a threshold amount of available or free BE resources and at least a threshold amount of available or free CPU or SP resources, then the criteria can specify to transition from applying the method M2 to the method M3. If for example the system is currently applying method M2 and the cache utilization is below the threshold but the system does not have at least a threshold amount of available or free BE resources and/or does not have at least a threshold amount of available or free CPU or SP resources, then the criteria can specify to transition from applying the method M2 to the method M1.

Figure 12:
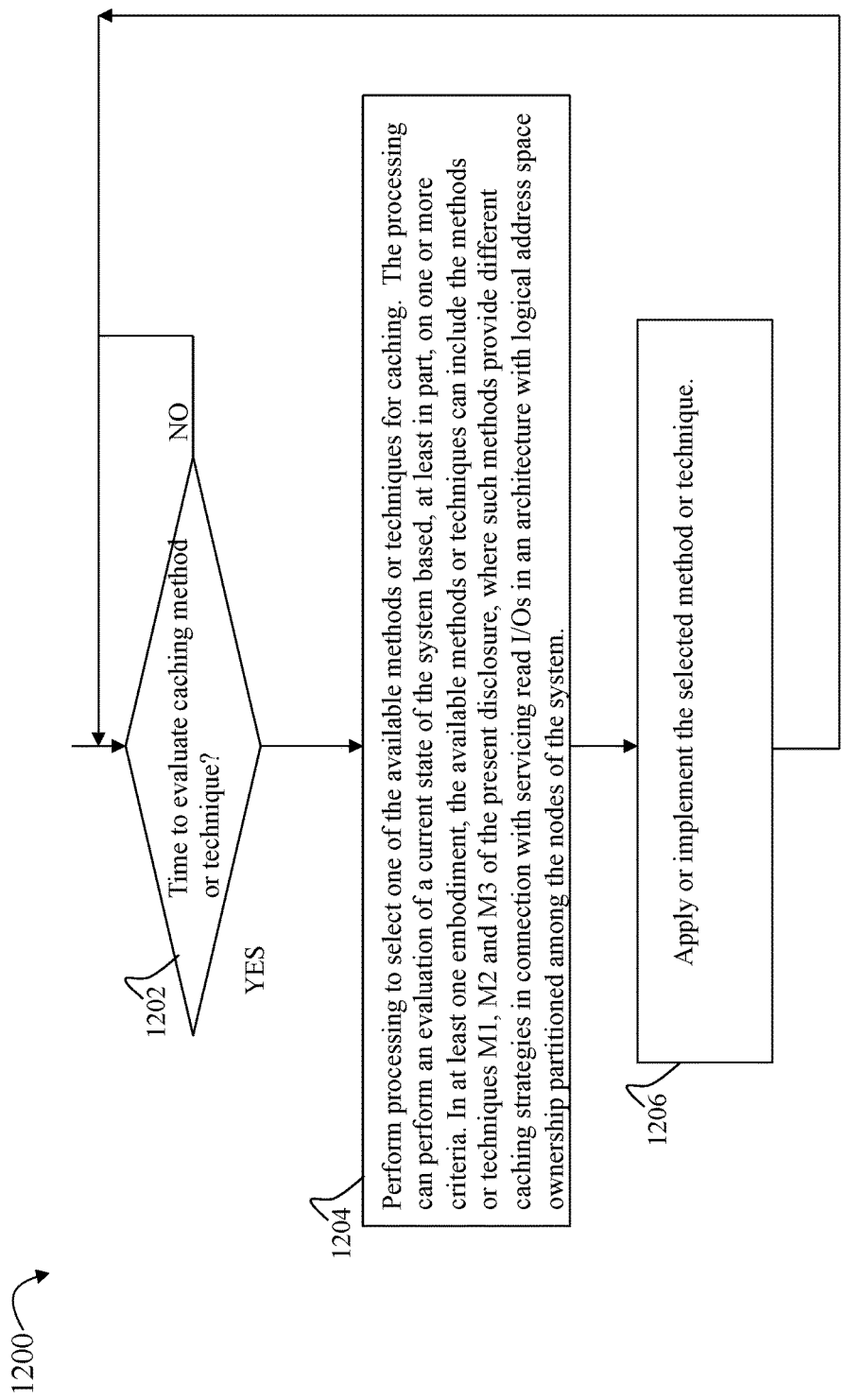

Referring to FIG. 12, shown is a flowchart 1200 summarizing processing described above in connection with dynamically selecting a caching technique or method in at least one embodiment in accordance with the techniques of the present disclosure.

At the step 1202, a determination can be made as to whether it is time to perform an evaluation and select one of the available methods or technique to apply. As discussed above, in at least one embodiment, such a determination and evaluation can be performed periodically. In at least one embodiment, one or more other trigger conditions or events, alone or in addition to periodic evaluation, can be specified which can result in the step 1202 evaluating to yes. For example, the one or more other trigger conditions or events can include changes to the amount of memory dedicated for data caching on one or more nodes. If the step 1202 evaluates to no, control remains at the step 1202. If the step 1202 evaluates to yes, control proceeds to the step 1204.

At the step 1204, processing can be performed to select one of the available methods or techniques for caching. The processing can perform an evaluation of a current state of the system based, at least in part, on one or more criteria. In at least one embodiment, the available methods or techniques can include the methods or techniques M1, M2 and M3 of the present disclosure, where such methods provide different caching strategies in connection with servicing read I/Os in an architecture with logical address space ownership partitioned among the nodes of the system. In at least one embodiment, the criteria can include the dynamic evaluation criteria and generally the considerations discussed above as well as other suitable criteria and/or conditions. From the step 1204, control proceeds to the step 1206.

At the step 1206, the selected method or technique (as selected in the step 1204) can be applied or implemented in the system. The selected method or technique can be different from a currently selected method or technique. For example, at a first point in time T1, a system can be applying or implementing method M2 prior to performing the steps 1204 and 1206. As a result of performing the steps 1204 and 1206, a different method, such as M1 or M3, can be selected. In this case, the system can perform processing at runtime to dynamically switch the currently applied or implemented caching technique from M2 to the newly selected method of M1 or M3. From the step 1206, control proceeds to the step 1202.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
    receiving, from a host at a first of a plurality of nodes, a read I/O operation directed to a target logical address, wherein the first node does not own the target logical address and wherein a second of the plurality of nodes owns the target logical address, wherein a first cache of the first node includes first information corresponding to the target logical address, wherein the first information of the first cache includes first content and a first address hint corresponding to the target logical address;
    the first node issuing a first request to the second node to perform first address resolution processing with respect to the target logical address owned by the second node, wherein the first request includes a first flag requesting that the second node, in response to the first request, suppress returning content stored at the target logical address;
    receiving, by the first node from the second node, a first response to the first request, wherein the first response includes a first address used to read a current content stored at the target logical address from back-end non-volatile storage; and
    responsive to receiving the first response, the first node performing first processing including:
        determining whether the first address of the first response matches the first address hint stored in the first cache of the first node; and
        responsive to determining that the first address of the first response and the first address hint of the first cache match, performing second processing including:
            determining that the first content cached in the first cache of the first node is valid and corresponds to the current content stored at the target logical address; and
            returning, in response to the read I/O operation, the first content cached in the first cache of the first node.

2. The computer-implemented method of claim 1, wherein the first processing further includes:
    responsive to determining the first address of the first response and the first address hint of the first cache do not match, performing third processing including:
        determining that the first content cached in the first cache of the first node is invalid and does not correspond to the current content stored at the target logical address;
        using the first address returned in the first response to read second content stored at the target logical address from back-end non-volatile storage; and
        returning the second content in response to the read I/O operation.

3. The computer-implemented method of claim 2, wherein said third processing further includes:
    updating the first information of the first cache of the first node, wherein said updating includes storing the second content and the first address included in the first response from the second node in the first cache of the first node, wherein the second content and the first address are included in the first information corresponding to the target logical address.

4. The computer-implemented method of claim 3, wherein said updating the first information of the first cache of the first node includes removing the first content and the first address hint from the first cache of the first node.

5. The computer-implemented method of claim 1, wherein said first address resolution processing performed by the second node in response to receiving the first request includes:
    using first mapping information including a plurality of metadata (MD) pages to map the target logical address to the first address included in the first response.

6. The computer-implemented method of claim 5, wherein the first address is a first indirect pointer (IDP) to a physical storage location on back-end non-volatile storage including the current content stored at the target logical address.

7. The computer-implemented method of claim 5, wherein the first address is an address of, or pointer to, a physical storage location on back-end non-volatile storage including the current content stored at the target logical address.

8. The computer-implemented method of claim 1, further comprising:
    receiving, from the host at the first node, a second read I/O operation directed to a second target logical address, wherein the first node does not own the second target logical address and wherein the second node owns the second target logical address, wherein the first cache of the first node does not include cached content corresponding to the second target logical address;
    the first node issuing a second request to the second node to perform second address resolution processing with respect to the second target logical address owned by the second node;
    responsive to receiving the second request, the second node performing third processing including:
        determining that a second cache of the second node includes second content corresponding to a second current content stored at the second target logical address; and
        sending, by the second node to the first node, a second response to the second request, wherein the second response includes the second content of the second cache that corresponds to the second current content stored at the second target logical address and wherein the second response includes a second address used to read the second current content stored at the second target logical address from back-end non-volatile storage.

9. The computer-implemented method of claim 8, further comprising:
    receiving, by the first node from the second node, the second response to the second request, wherein the second response includes the second address and wherein the second response includes the second content of the second cache that corresponds to the second current content stored at the second target logical address;

responsive to receiving the second response, the first node performing fourth processing including:

determining that the first cache of the first node does not include content stored at the second target logical address; and responsive to determining that the first cache of the first node does not include content stored at the second target logical address, storing second information in the first cache of the first node, wherein the second information corresponds to the second target logical address and wherein the second information includes the second address of the second response and includes the second content of the second response, wherein the second address denotes a second address hint used in connection with validating that the second content of the first cache denotes the second current content stored at the second target logical address.

10. The computer-implemented method of claim 9, wherein the fourth processing includes:

the first node returning the second content in response to the second read I/O operation.

11. The computer-implemented method of claim 1, further comprising:

partitioning a logical address space into a plurality of slices where each of the plurality of slices corresponds to one of a first plurality of logical address subranges of the logical address space;

forming a plurality of sets, wherein each of the plurality of sets includes a portion of the plurality of slices; and assigning the plurality of sets to the plurality of nodes of a storage system, where each of the plurality of nodes is assigned a single one of the plurality of sets, wherein said each node owns slices of said single set assigned to said each node, and wherein said each node owns logical addresses of slices included in said single set assigned to said each node.

12. The computer-implemented method of claim 11, wherein the plurality of nodes is two nodes, the first node and the second node.

13. The computer-implemented method of claim 12, further comprising:

assigning a slice identifier (ID) to each of the plurality of slices, said slice ID uniquely identifying said each slice with respect to other of the plurality of slices, where each slice ID assigned to a corresponding one of the plurality of slices is an integer included in a sequence of consecutive increasing integers;

forming a first slice set including only first slices, where the first slices only include ones of the plurality of slices having an odd slice ID; and forming a second slice set including only second slices, where the second slices only include ones of the plurality of slices having an even slice ID, wherein the first slice set denotes slices owned by one of the first node and the second node, and wherein the second slice set denotes slices owned by an other of the first node and the second node.

14. The computer-implemented method of claim 13, wherein slices of the first slice set are interleaved with slices of the second slice set in the logical address space, wherein the first plurality of logical address subranges of the logical address space are consecutive contiguous subranges of logical addresses, and wherein the slice IDs assigned to the plurality of slices denote a relative position of the plurality of slices in the logical address space.

15. One or more non-transitory computer readable media comprising code stored thereon that, when executed, performs a method comprising:

partitioning a logical address space into a plurality of slices where each of the plurality of slices corresponds to one of a first plurality of logical address subranges of the logical address space;

forming a plurality of sets, wherein each of the plurality of sets includes a portion of the plurality of slices;

assigning the plurality of sets to a plurality of nodes of a storage system, where each node of the plurality of nodes is assigned a single set of the plurality of sets, wherein said each node owns slices of said single set assigned to said each node, and wherein said each node owns logical addresses of slices included in said single set assigned to said each node;

selecting, in accordance with one or more criteria, one of a plurality of caching techniques to apply in the storage system, wherein the plurality of caching techniques includes a first technique and a second technique, wherein the first technique allows each node to cache content of logical addresses owned by said each node and does not allow said each node to cache content of logical addresses that are not owned by said each node, wherein the second technique allows said each node to cache content of logical addresses that are owned by said each node and allows said each node to cache content of logical addresses that are not owned by said each node; and applying the selected one technique in the storage system in connection with caching content of logical addresses, wherein said applying the selected one technique includes:

a non-owner node of a first logical address LA1 receiving a read I/O operation directed to LA1; and the non-owner node issuing a request to an owner node of LA1 to perform address resolution processing for LA1.

16. The one or more non-transitory computer readable media of claim 15, wherein the plurality of caching techniques includes a third technique that allows each node of the plurality of nodes to cache content of logical addresses owned by said each node and does not allow said each node to cache content of logical addresses that are not owned by said each node, and wherein the method includes selecting the third technique as the selected one technique and wherein said applying the selected one technique includes applying the third technique on the storage system, wherein said applying the third technique includes:

said receiving, by the non-owner node of LA1, the read I/O operation directed to LA1;

said issuing, by the non-owner node to an owner node of LA1, the request to perform address resolution processing for LA1;

responsive to receiving the request, the owner node performing address resolution processing of LA1 using first mapping information and determining a first address used to read first content stored at LA1 from back-end non-volatile storage;

the owner node returning, to the non-owner node, a response to the request, wherein the response includes the first address;

the owner node using the first address to perform a speculative or opportunistic read of the first content stored at LA1 from back-end non-volatile storage;
the owner node caching the first content, as read from back-end non-volatile storage, in a first cache of the first node, wherein the first content cached on the first cache of the first node is associated with LA1; and
responsive to the non-owner node receiving the response, the non-owner node performing first processing including:
using the first address of the response to read the first content stored at LA1 from back-end non-volatile storage; and
returning the first content in response to the read I/O operation without caching the first content in a local cache of the non-owner node.

17. The one or more non-transitory computer readable media of claim 15, wherein the method includes selecting the second technique as the selected one technique, wherein said applying the selected one technique includes applying the second technique on the storage system, and wherein said applying the second technique includes:
said receiving, by the non-owner node of LA1, the read I/O operation directed to LA1;
said issuing, by the non-owner node to an owner node of LA1, the request to perform address resolution processing for LA1;
responsive to receiving the request, the owner node returning, to the non-owner node a response to the request, wherein the response includes a first address used to read first content stored at LA1 from back-end non-volatile storage and wherein the response conditionally includes the first content if the first content is cached locally on the owner node, wherein the response conditionally does not include the first content if the first content is not cached locally on the owner node;
responsive to the non-owner node receiving the response, the non-owner node performs first processing including:
determining whether the response includes the first content of LA1;
responsive to determining the response includes the first content, the non-owner node returning the first content in response to the read I/O; and
responsive to determining the response does not include the first content, the non-owner node using the first address of the response to read the first content stored at LA1 from back-end non-volatile storage, and then returning the first content in response to the read I/O operation; and
the non-owner node caching the first address and the first content locally on the non-owner node.

18. The one or more non-transitory computer-readable media of claim 17, wherein, responsive to receiving the request from the non-owner node, the owner node performs second processing including:
determining whether the first content stored at LA1 is cached locally on the owner node;
responsive to determining that the first content is not cached locally on the owner node, the owner node performing third processing including:
performing address resolution processing of LA1 using first mapping information to obtain the first address used to read first content stored at LA1 from back-end non-volatile storage; and
returning the response that includes the first address without the first content; and responsive to determining that the first content is cached locally on the owner node, the owner node performing fourth processing including:
performing address resolution processing of LA1 using the first mapping information to obtain the first address used to read first content stored at LA1 from back-end non-volatile storage; and
returning the response that includes the first address and includes the first content as cached locally on the owner node.

19. The one or more non-transitory computer readable media of claim 15, wherein the one or more criteria include dynamic evaluation criteria based, at least in part, on one or more of the following: one or more cache-related metrics, one or more metrics regarding back-end resource consumption, one or more metrics regarding CPU resource consumption, cache size, cache hit ratio, back-end disk utilization, back-end controller utilization, back-end I/O workload, CPU utilization regarding main CPUs, average retention time denoting an average amount of time a data page remains in cache, and an average number of hits per data page while data pages remain in cache.

20. A system comprising:
one or more processors; and
one or more memories comprising code stored thereon that, when executed, performs a method comprising:
receiving, from a host at a first of a plurality of nodes, a read I/O operation directed to a target logical address, wherein the first node does not own the target logical address and wherein a second of the plurality of nodes owns the target logical address, wherein a first cache of the first node includes first information corresponding to the target logical address, wherein the first information of the first cache includes first content and a first address hint corresponding to the target logical address;
the first node issuing a first request to the second node to perform first address resolution processing with respect to the target logical address owned by the second node, wherein the first request includes a first flag requesting that the second node, in response to the first request, suppress returning content stored at the target logical address;
receiving, by the first node from the second node, a first response to the first request, wherein the first response includes a first address used to read a current content stored at the target logical address from back-end non-volatile storage; and
responsive to receiving the first response, the first node performing first processing including:
determining whether the first address of the first response matches the first address hint stored in the first cache of the first node; and
responsive to determining that the first address of the first response and the first address hint of the first cache match, performing second processing including:
determining that the first content cached in the first cache of the first node is valid and corresponds to the current content stored at the target logical address; and
returning, in response to the read I/O operation, the first content cached in the first cache of the first node.

* * * * *